P. W. LEFFLER, DEC'D.
A. A. LEFFLER, ADMINISTRATRIX.
ELECTRIC RAILWAY SYSTEM.
APPLICATION FILED AUG. 13, 1908. RENEWED AUG. 10, 1914.

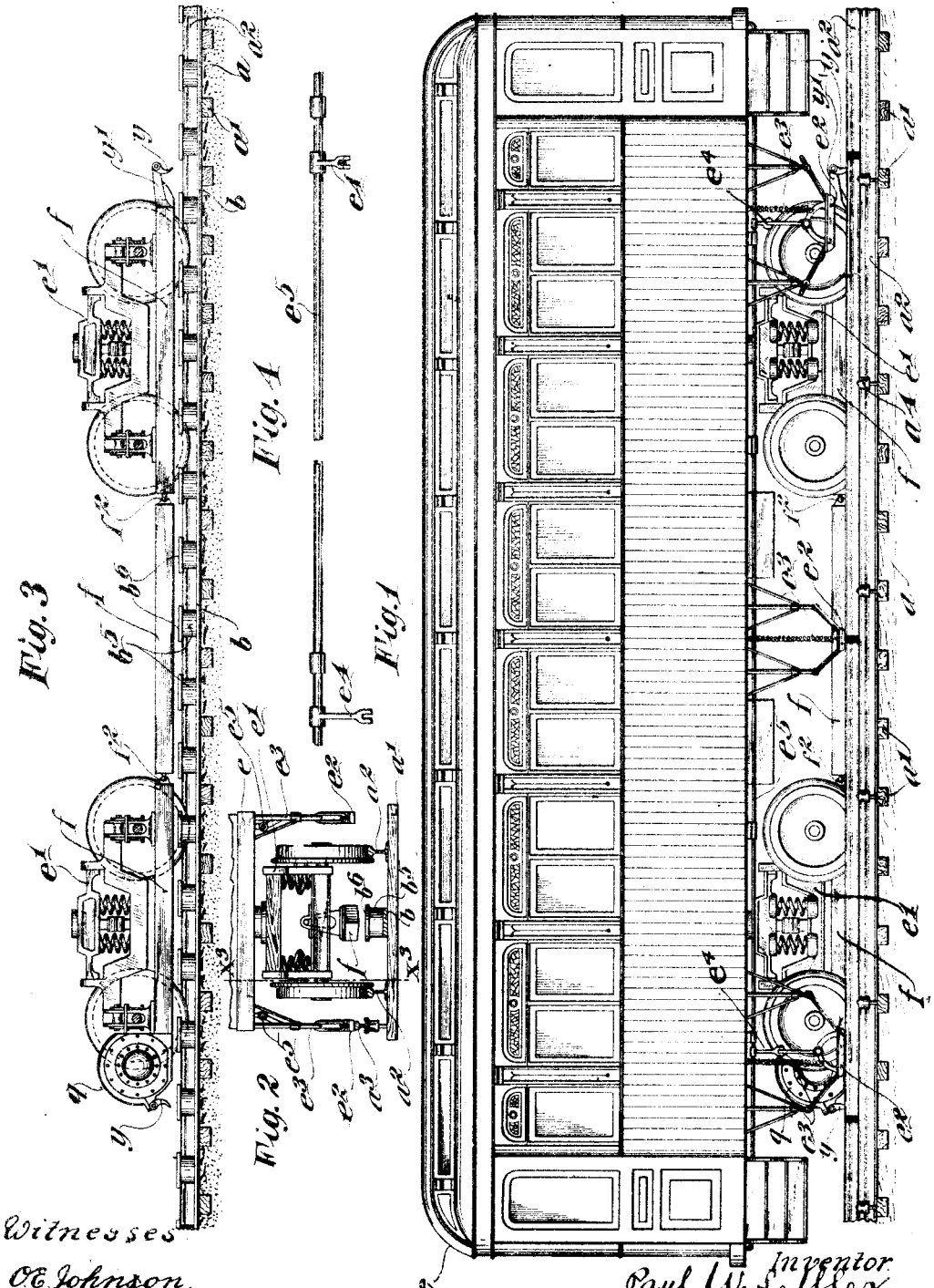

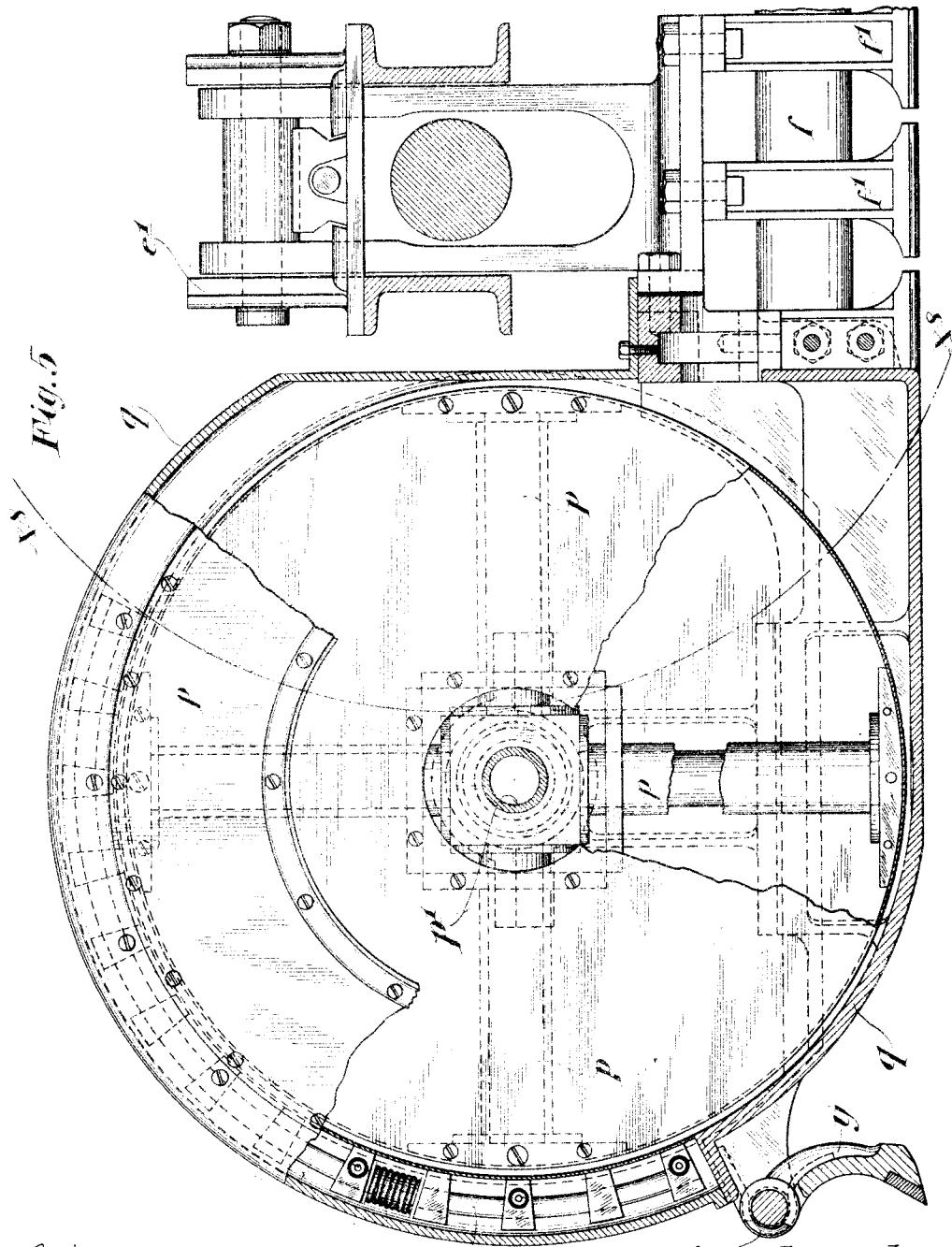

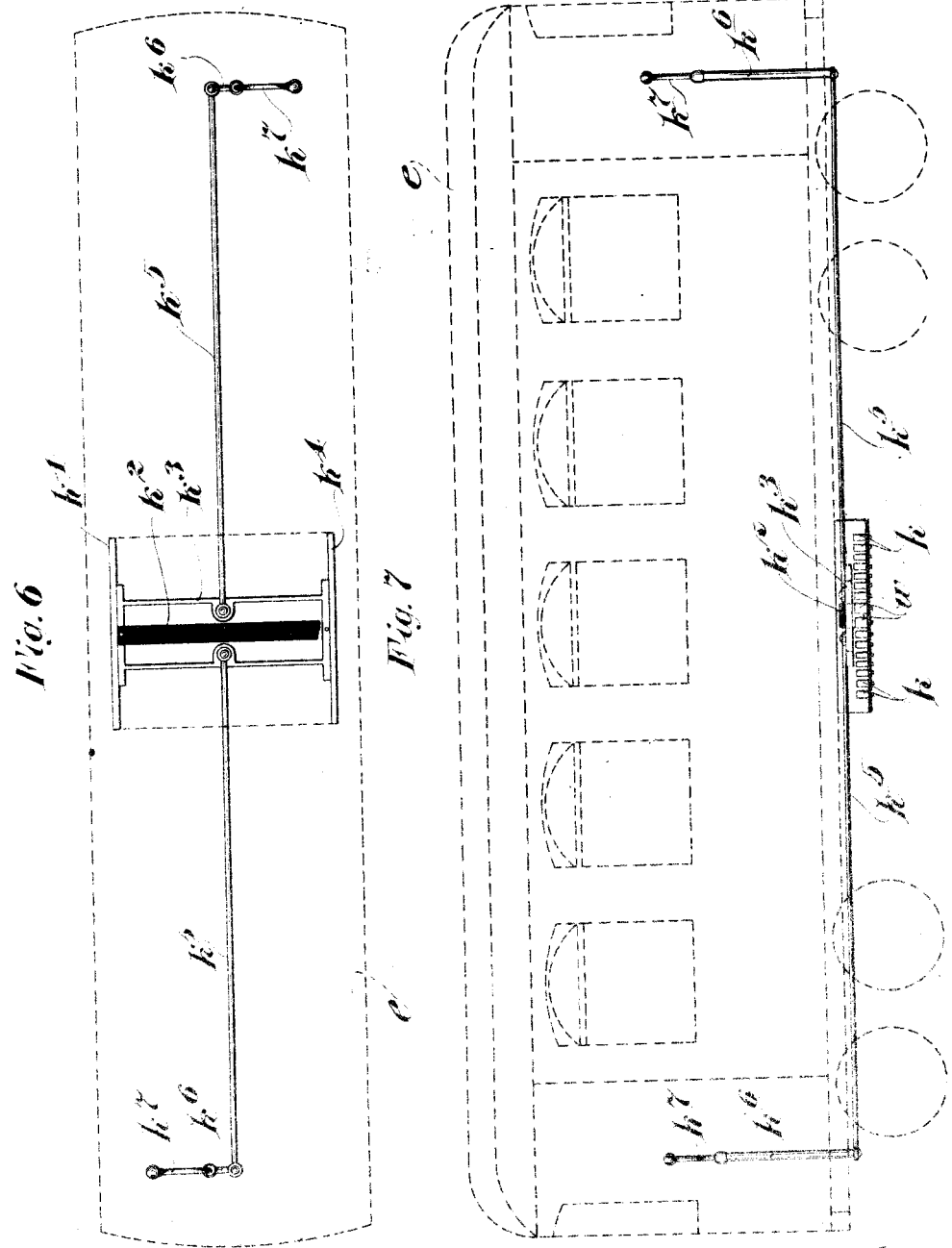

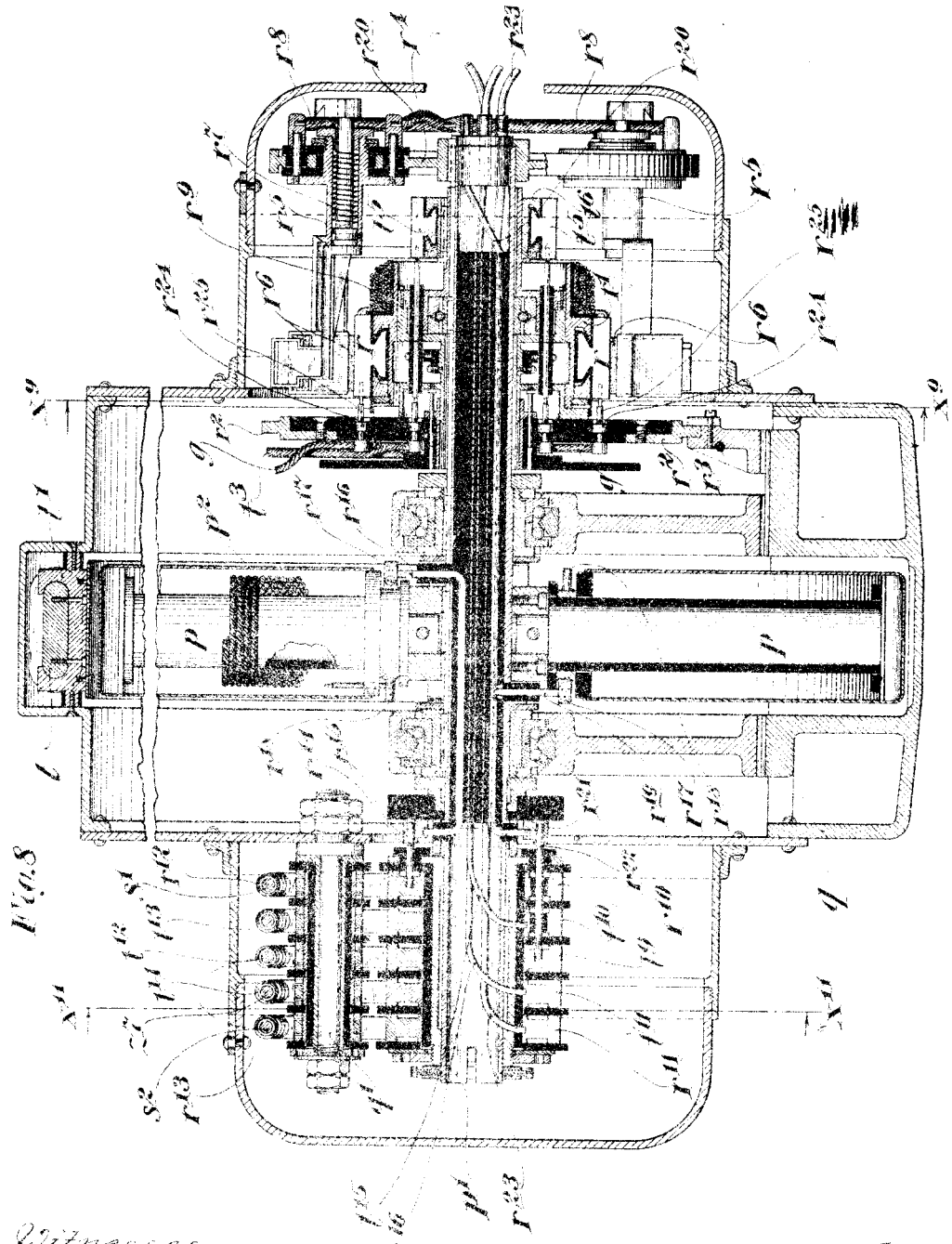

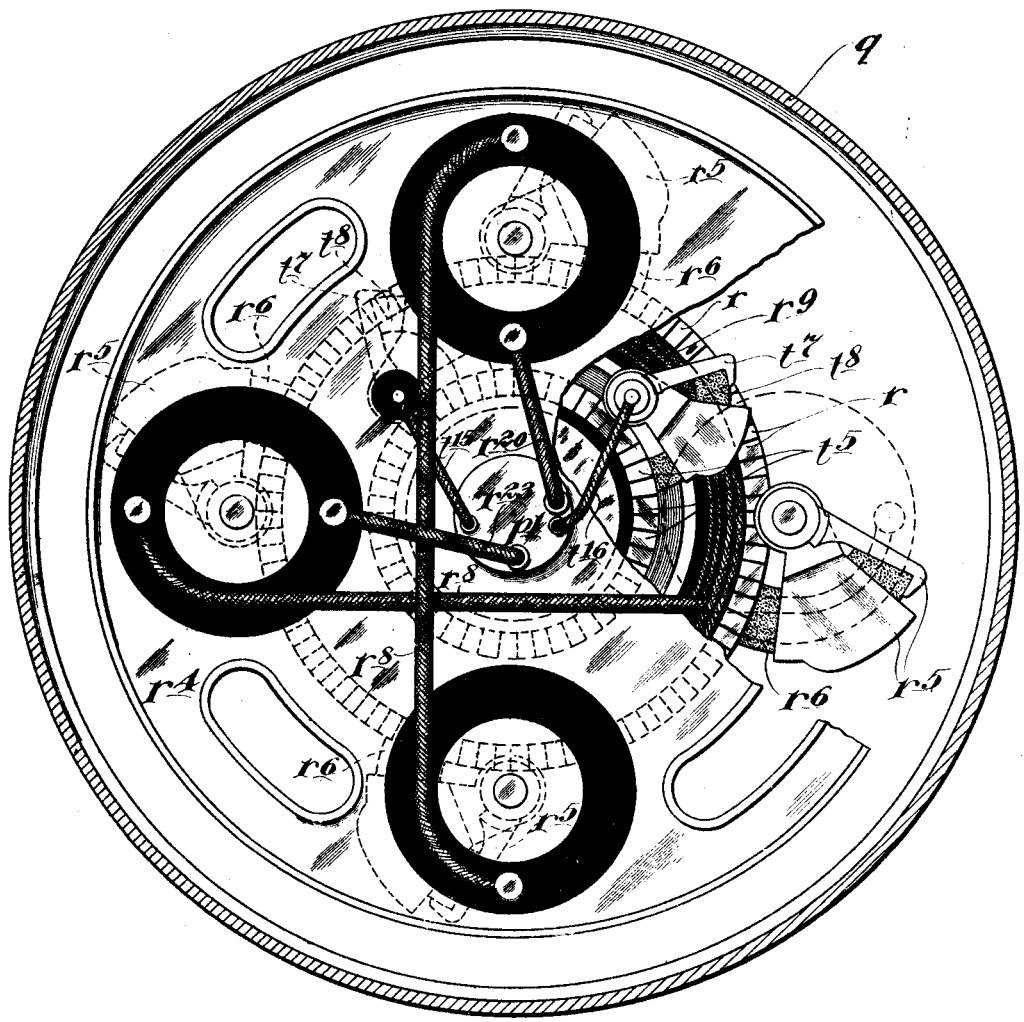

1,133,296.

Patented Mar. 30, 1915.
18 SHEETS—SHEET 6.

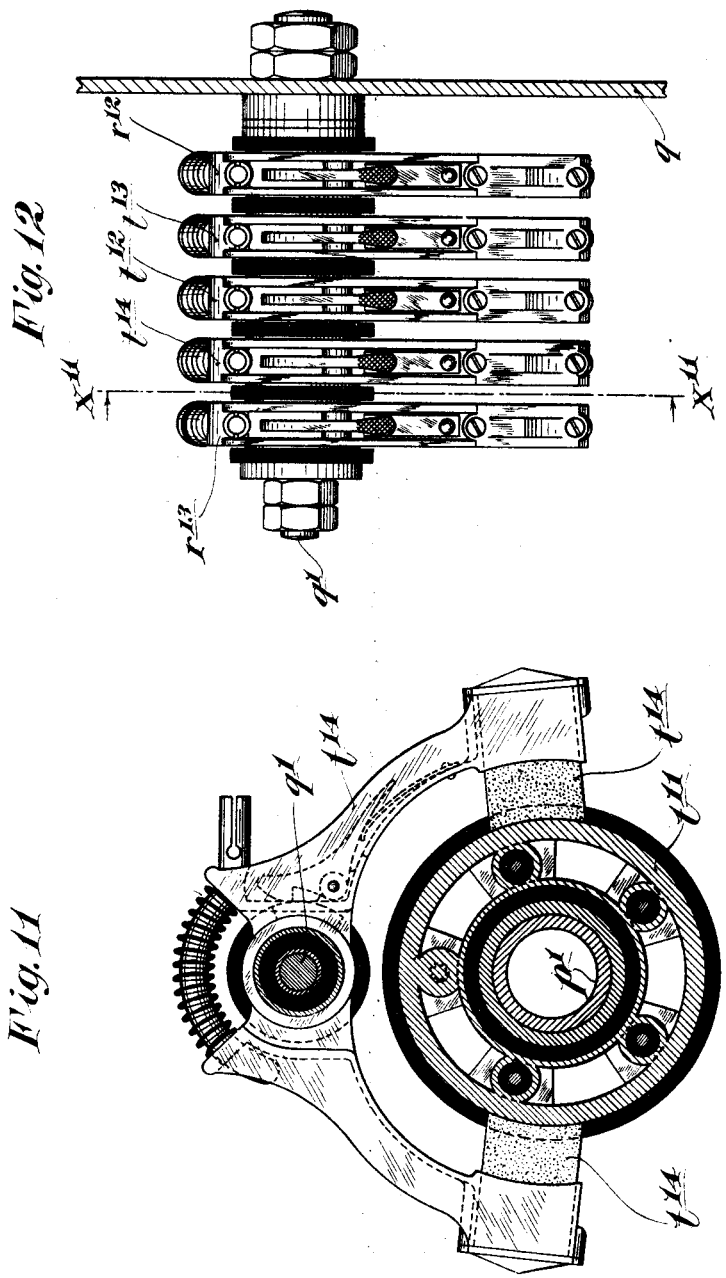

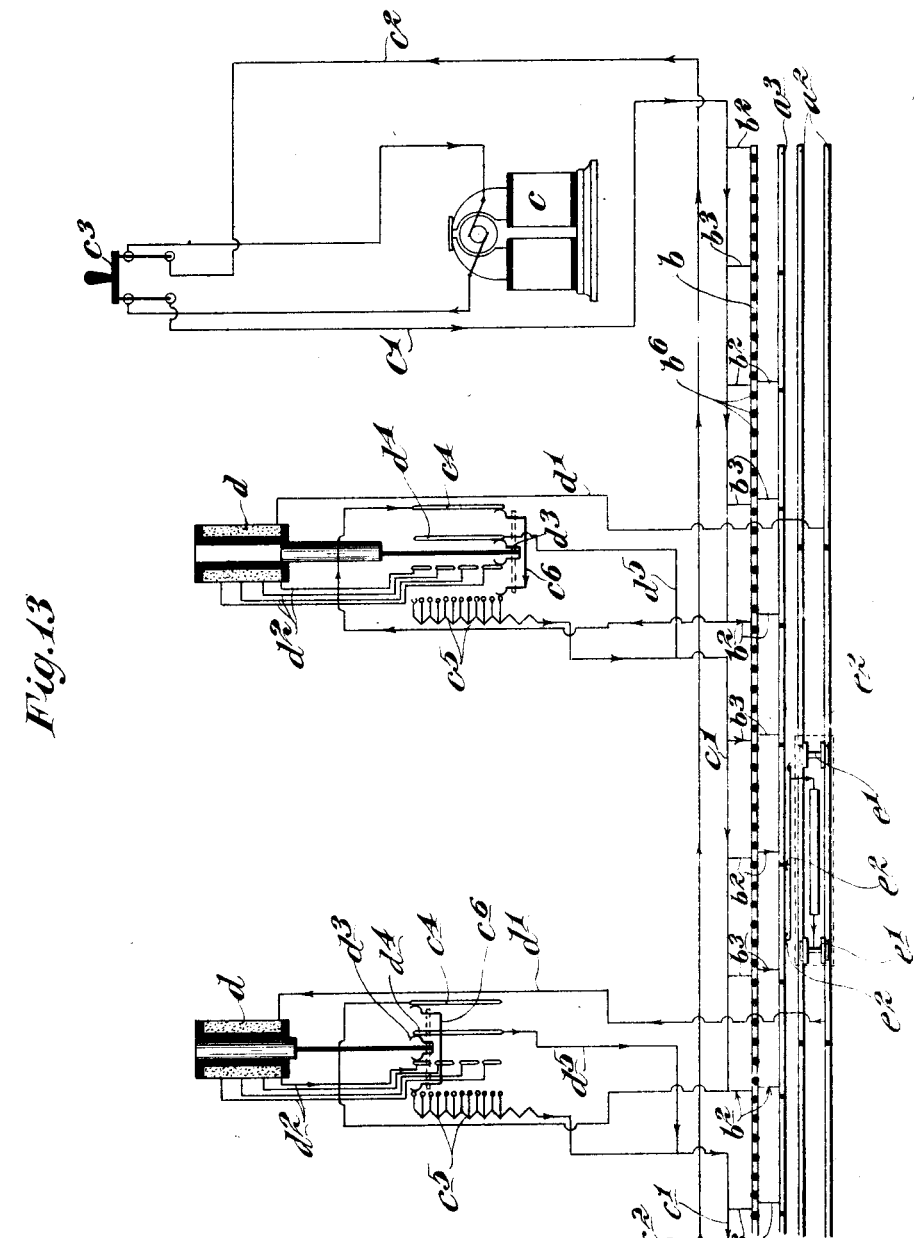

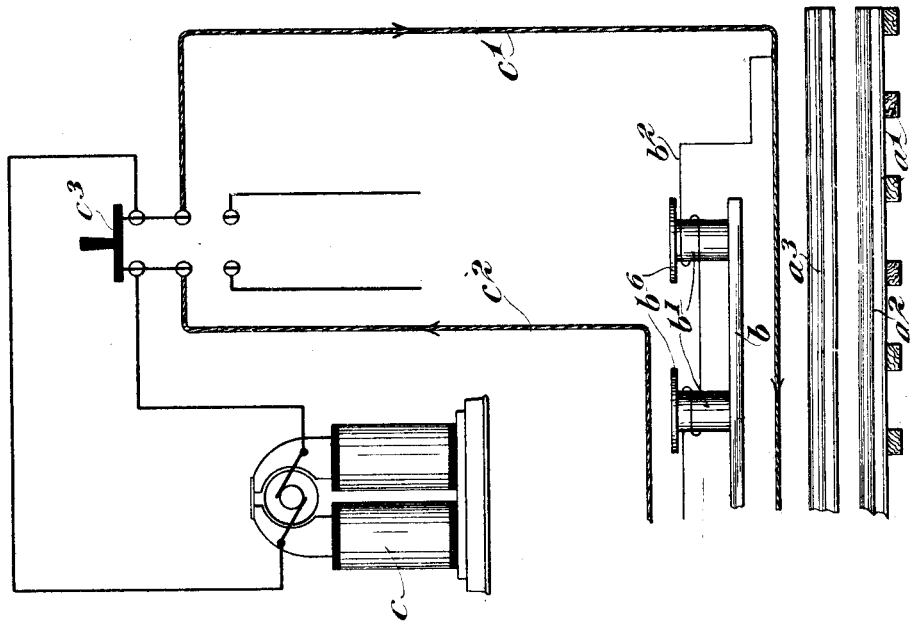
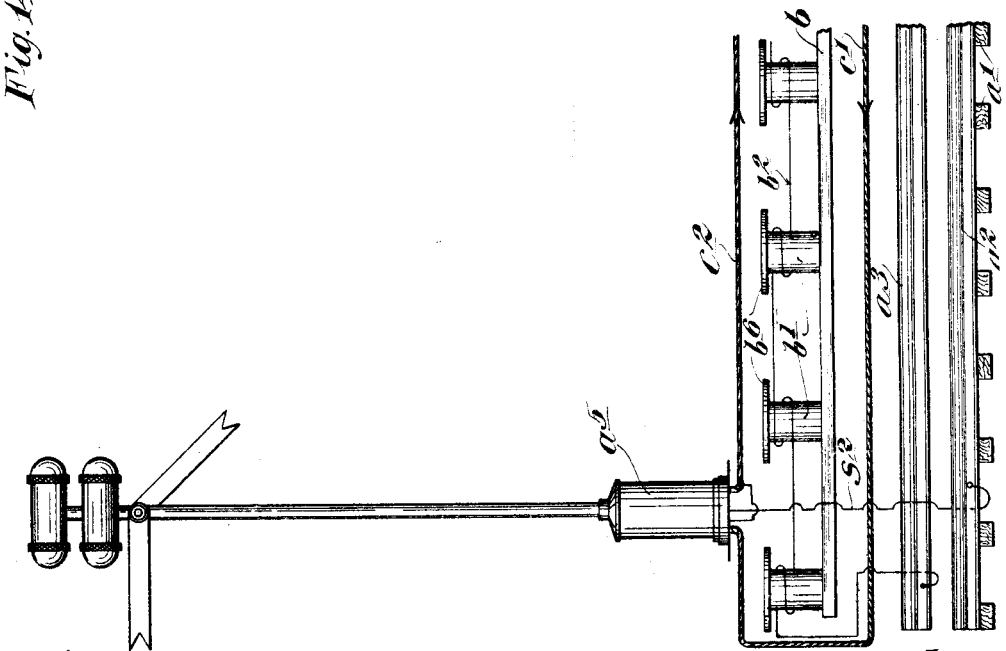

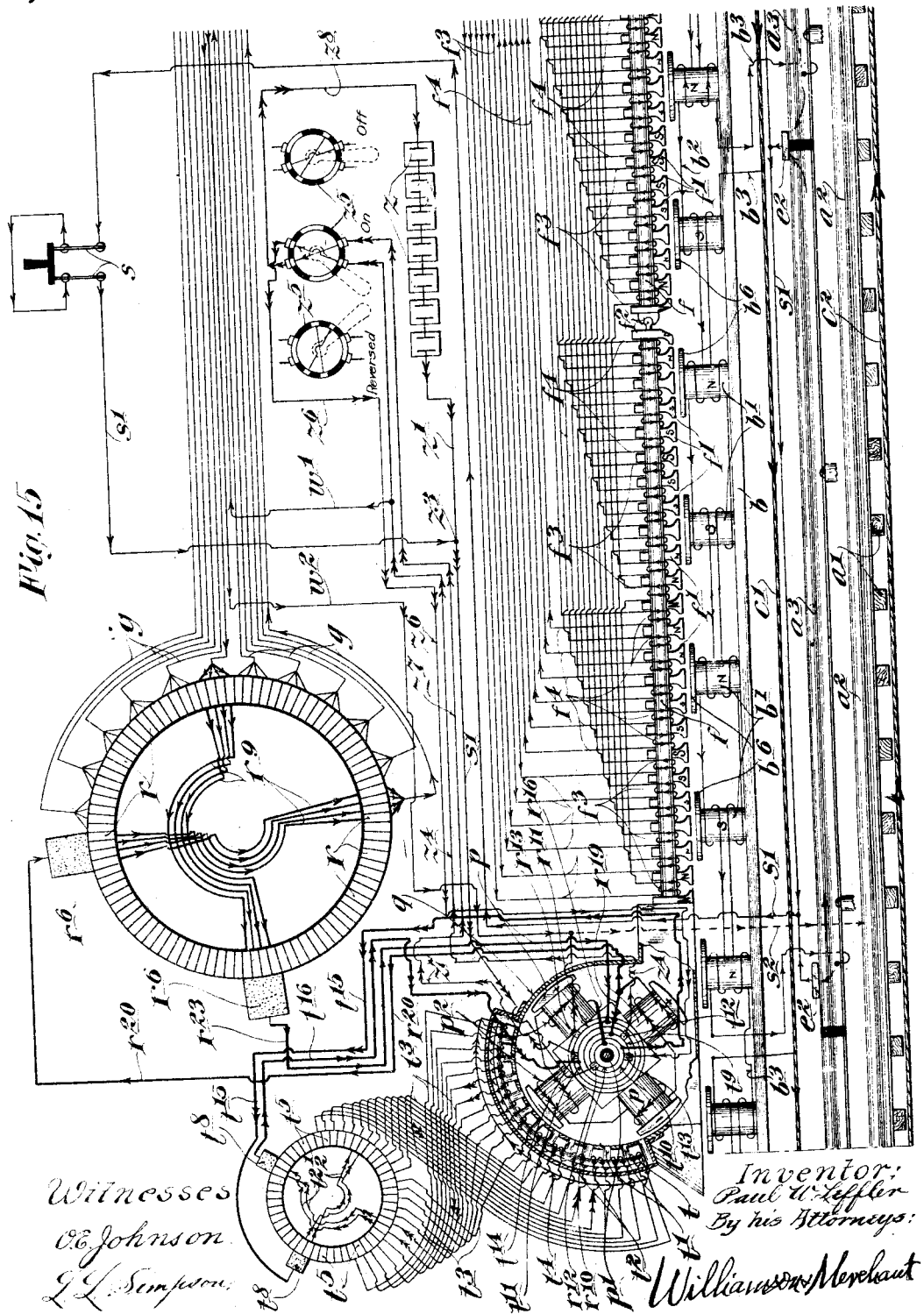

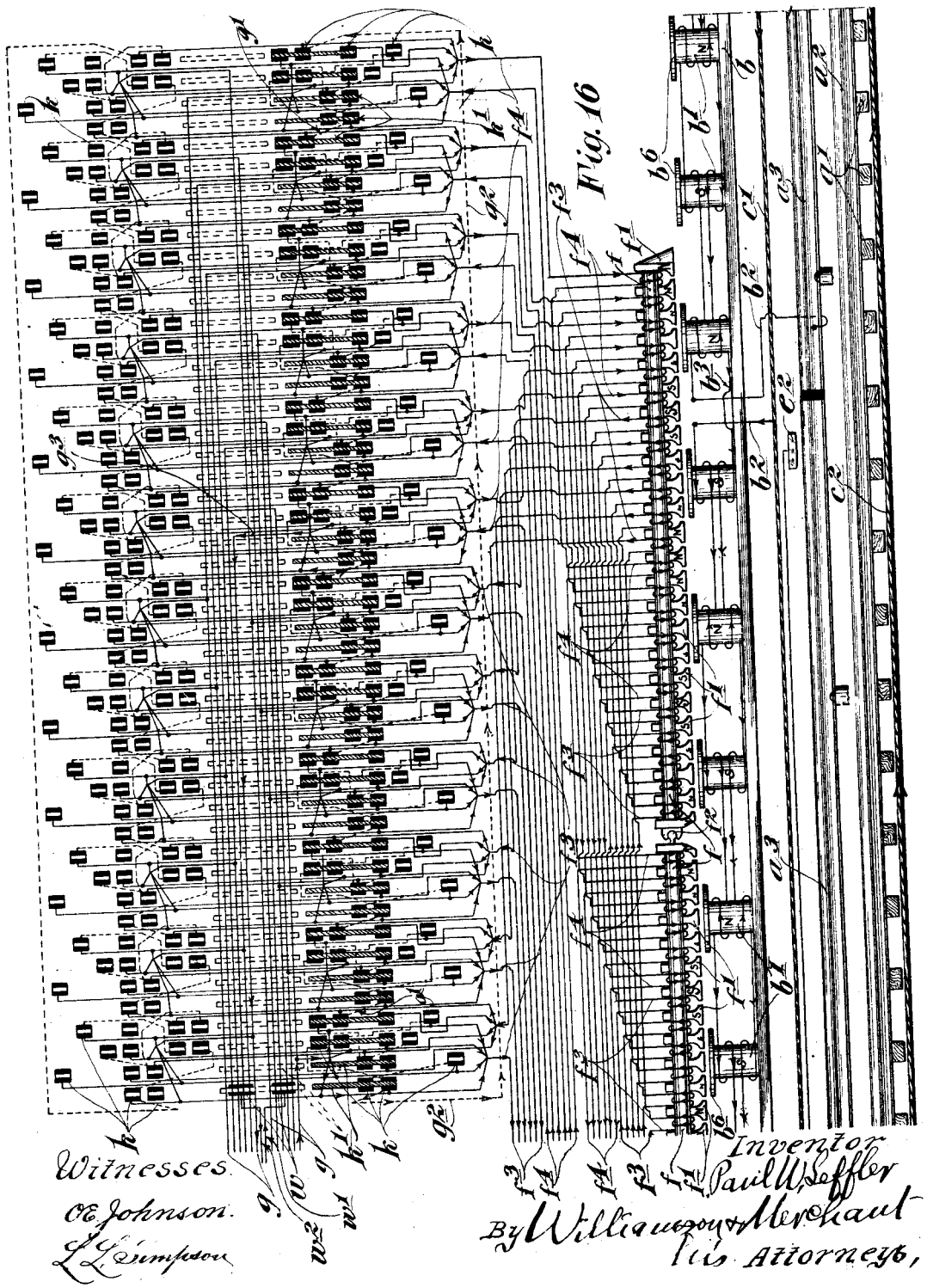

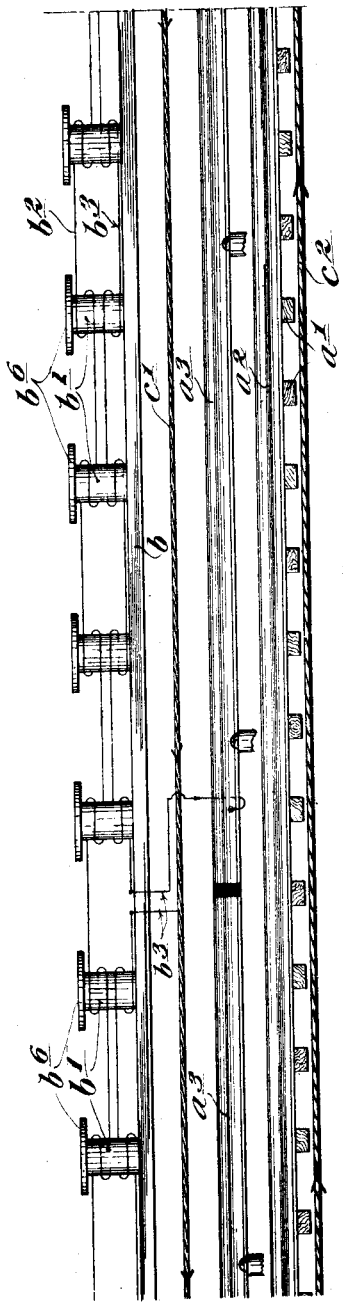
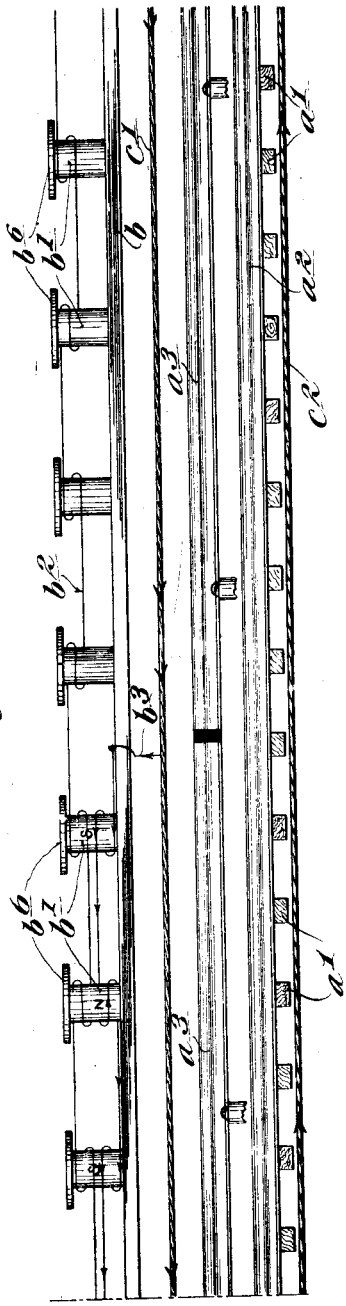

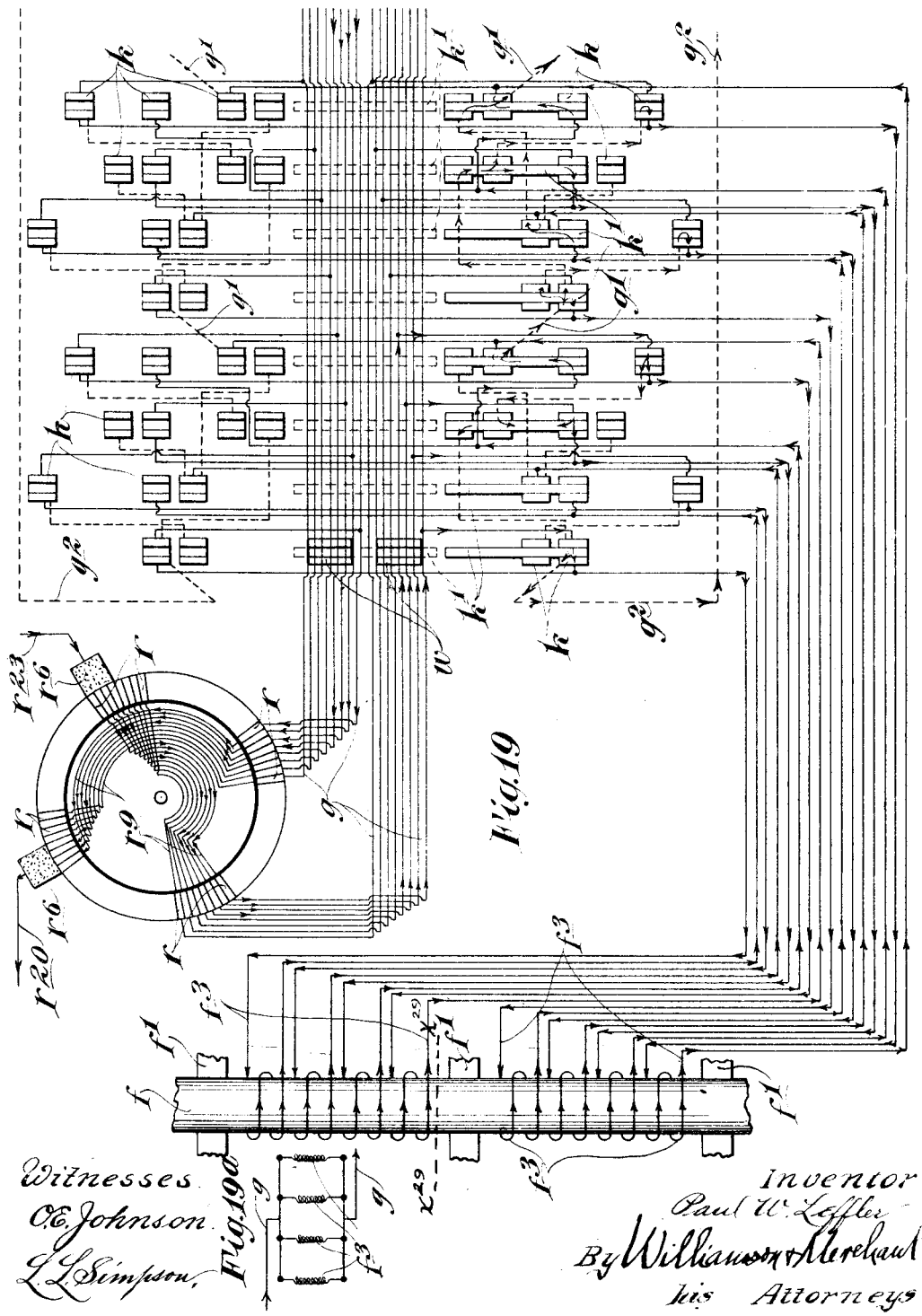

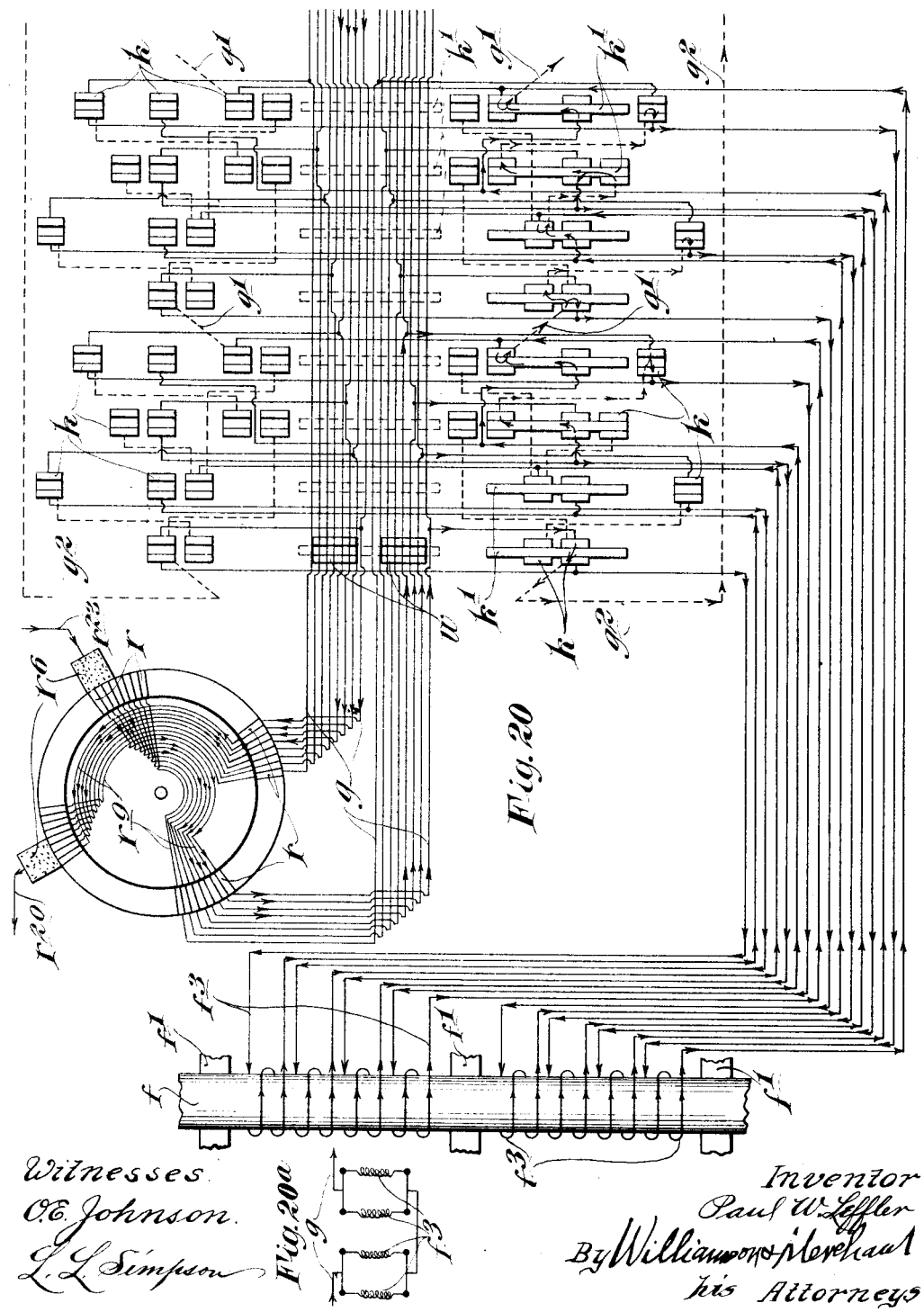

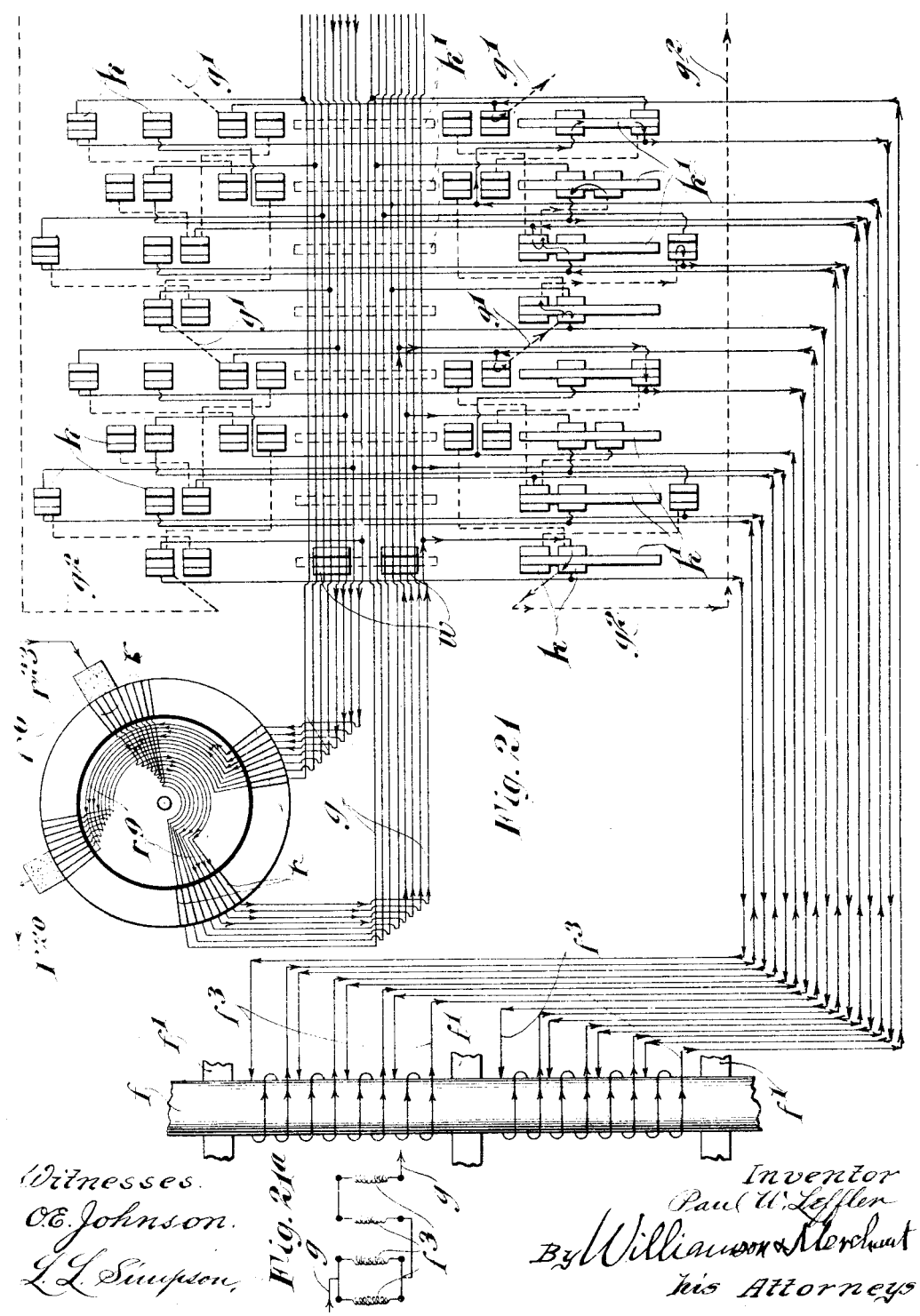

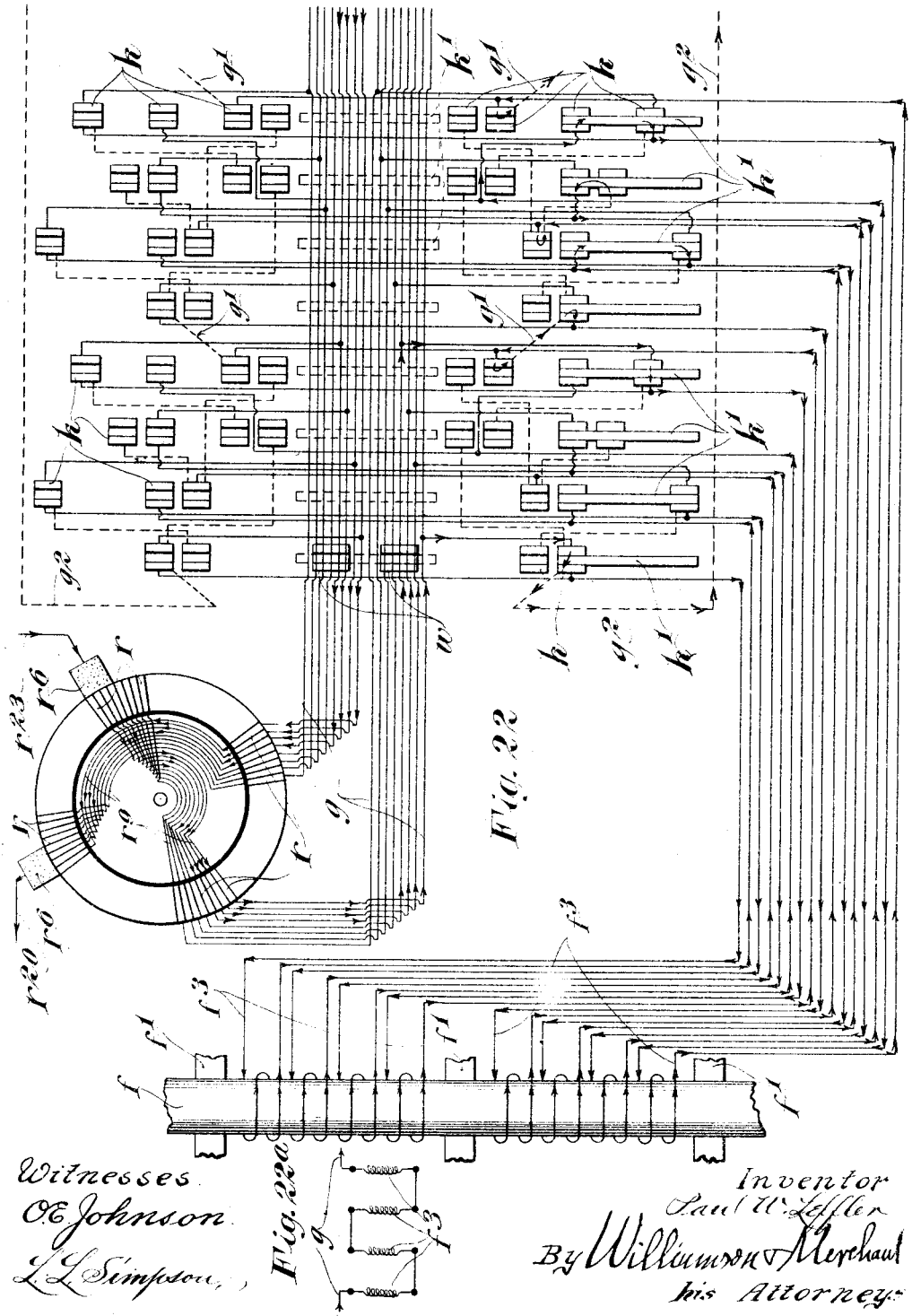

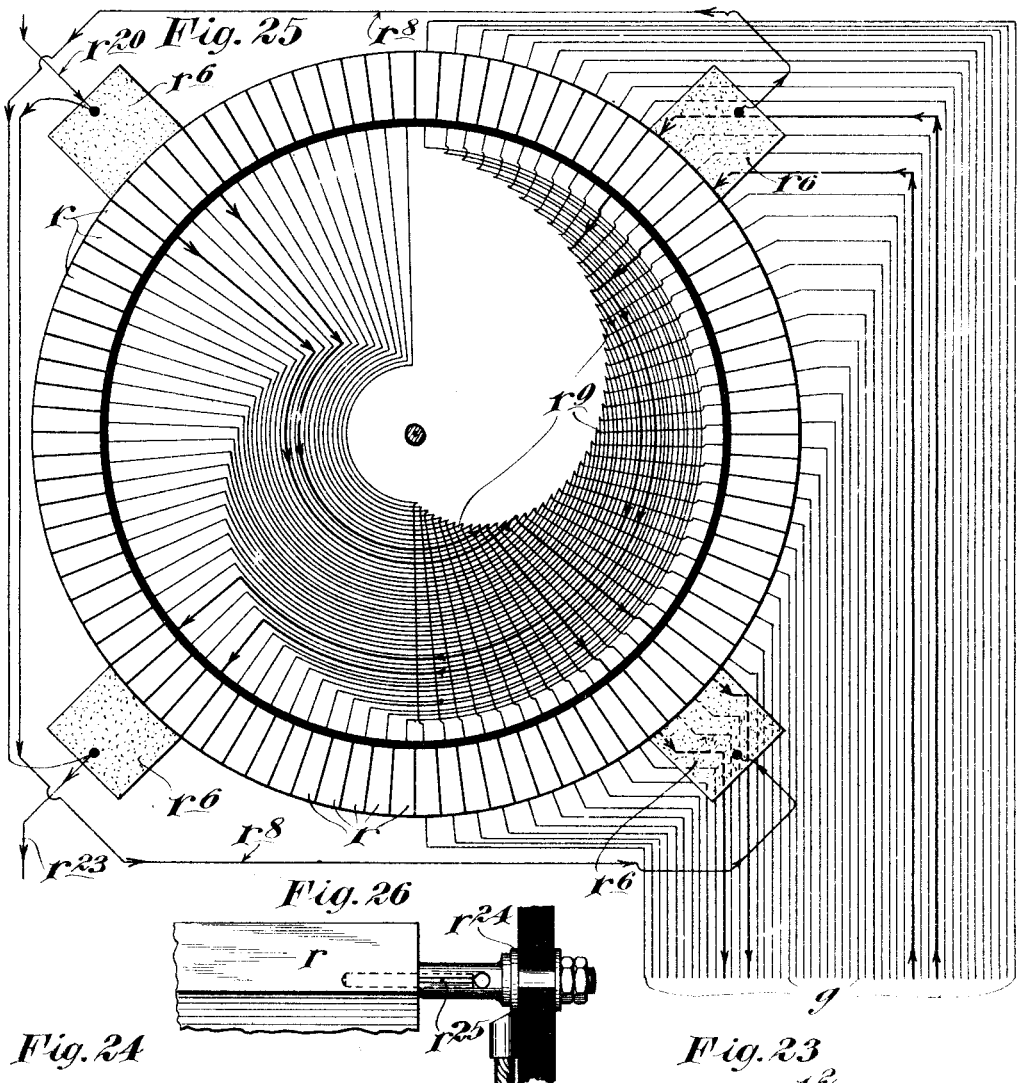
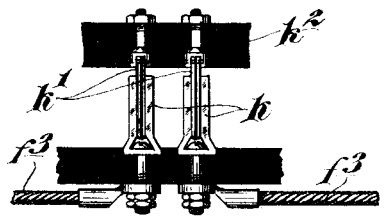
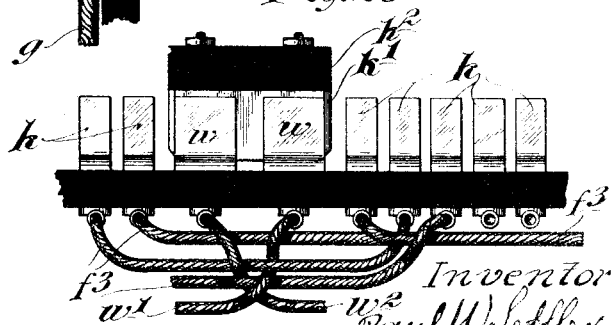

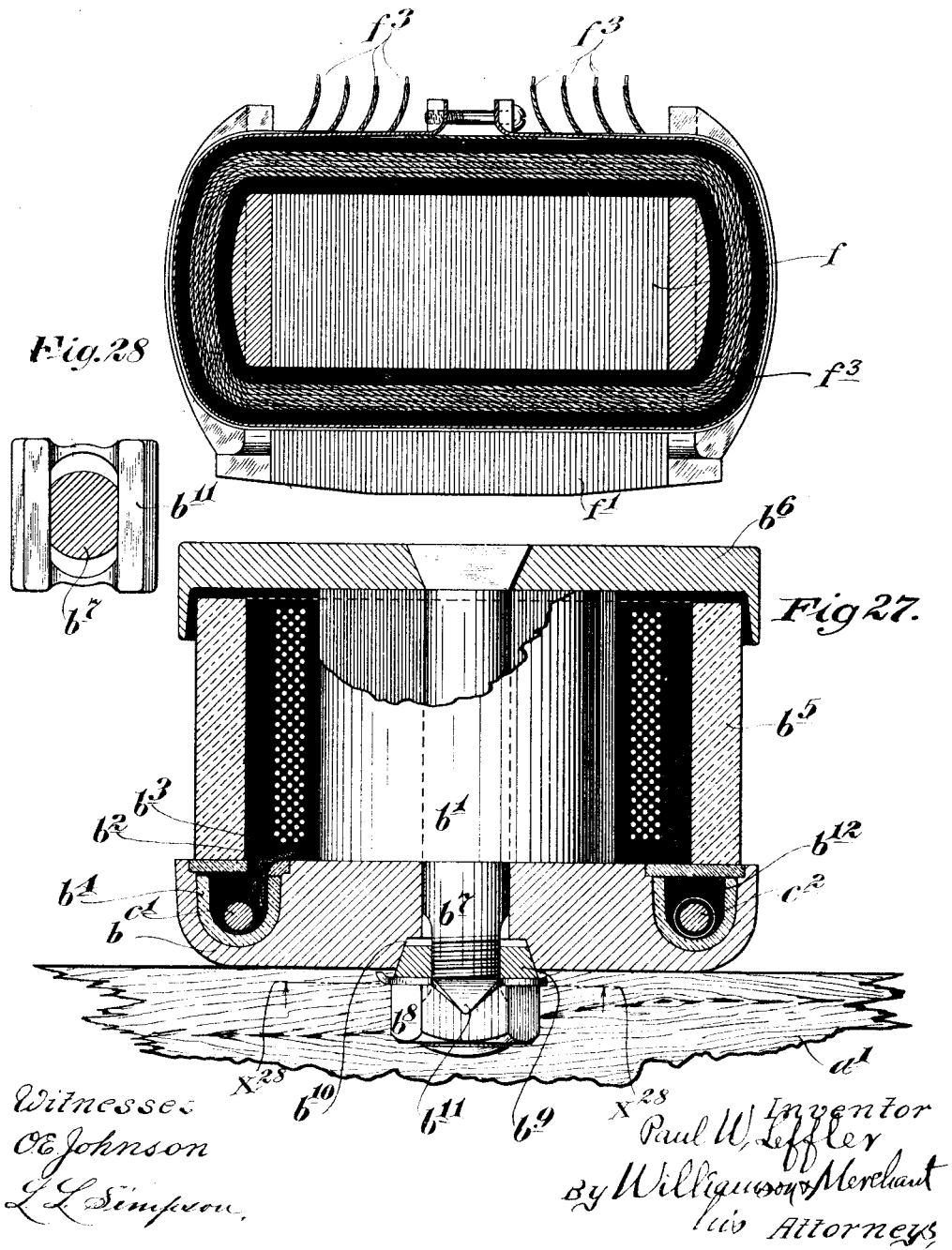

UNITED STATES PATENT OFFICE.

PAUL W. LEFFLER, OF CHICAGO, ILLINOIS; ANNA A. LEFFLER, ADMINISTRATRIX OF SAID PAUL W. LEFFLER, DECEASED, ASSIGNOR TO LEFFLER ELECTRIC SYSTEM, OF CHICAGO, ILLINOIS, A CORPORATION OF MAINE.

ELECTRIC-RAILWAY SYSTEM.

1,133,296. Specification of Letters Patent. Patented Mar. 30, 1915.

Application filed August 13, 1908, Serial No. 448,269. Renewed August 10, 1914. Serial No. 856,142.

*To all whom it may concern:*

Be it known that I, PAUL W. LEFFLER, a citizen of the United States, residing at Chicago, in the county of Cook and State of Illinois, have invented certain new and useful Improvements in Electric-Railway Systems; and I do hereby declare the following to be a full, clear, and exact description of the invention, such as will enable others skilled in the art to which it appertains to make and use the same.

My invention has for its object to provide an improved electric system for the propulsion of cars or other traveling bodies; and to this end, the invention consists of the novel devices and combinations of devices hereinafter described and pointed out in the claims.

From the broad point of view, the system illustrated is in the line of the system disclosed and claimed in my foundation U. S. Patents 514,718 and 514,561, both of date February 13th, 1894, and some of the features disclosed are covered by my prior Patents 561,898, of date June 9th, 1896; and 573,822 and 573,823, both of date December 22nd, 1896. My present invention, however, does not relate simply to improvement in details over my old system illustrated in the above identified patents, but includes some radically new features differing in principle from those involved in my old system.

General statement.

In my said system, as may be seen on reference to my above named prior patents, electro-magnets are located in the roadbed, suitably spaced apart from each other, and are connected into a supply circuit, for affording a magnetic field which extends along the entire line of the car's travel; a non-rotating armature is carried by the car with the cores of its magnets traveling close to the cores of the field magnets; the windings of the armature are arranged in sets, interpositioned in respect to each other, with the members of each set connected up in series; a magnetic pole changer is carried by the car including a magnetic driver or pole charger armature subject to the field magnets, for imparting rotary motion thereto, and a commutator operated by this magnetic driver, for reversing the direction of the current through the armature circuits, so as to change the polarity of the armature magnets as required for coöperation with the field magnets. The field magnets are so wound that adjacent members are of opposite polarity, and the interpositioned sets of armature magnets are so wound that a proper number thereof on each of the opposite sides of a given field magnet, at any given instant of time, will be of opposite polarity in respect to each other; and hence, so that every field magnet will coöperate with certain of the armature magnets to give a pull and with certain others thereof to give a push, coöperating to move the car in a common direction. The pole changing mechanism operates to change the polarity of the armature magnets, according to the speed of the car, so that the proper relation is always maintained between the armature and the field magnets. The field magnets are so connected into the supply circuit that only a certain portion of the field, to-wit, that over which the car is passing, at a given time, will be subject to the full force of the supply circuit. In my system, as disclosed in my said prior patents, a storage battery was shown as carried on the car to supply current for the car armature and the magnetic pole changer; and a combined regulating and reversing device was also carried on the car for controlling the same. The field sections were rendered active or inactive, under the control of the car, through automatic switches operated by the car. From the foregoing, it will be seen that the field magnets and the electric devices on the car were in separate and entirely distinct electric circuits; and that the current supplied to the car armature from the storage battery thereon varied according to load.

Referring now to my present improvements, one of the most radical features of the invention is the use of a common supply circuit both for the field magnets and the cars along the line of travel, and for the non-rotating armature and the pole changer on the car, which supply circuit receives current from a D. C. series wound dynamo with several sets of such dynamos connected in series, and delivering said current at a predetermined substantially constant, but relatively low current (preferably about 15 amperes), and which dynamos or the like are automatically regulated to vary the voltage according to the speed or load. The said dynamos, field magnets, car armature and pole changer are all connected up into this common supply circuit in series. With this constant and low current, it is easy to construct a system in such a way as to avoid burn-outs; and another and far greater advantage is that, by the proper winding of the armature, a higher efficiency can be secured from any given amount of energy supplied from the generator or generators because there is far less loss in transmission, and because a higher speed is rendered available due to the fact that the voltage at the generator or generators will increase in proper proportion to compensate for the C. E. M. F.

Another radical feature of my invention is the peculiar form of windings which I employ on the car armature, for utilizing the said form of supply current to the greatest advantage in my sytem. Otherwise stated, I employ armature windings which are variable, at the will of the operator, to increase or decrease the number of ampere turns on the armature. To this end, the armature magnets are wound with cables each composed of a plurality of wires, to-wit, four in the instance illustrated, and this is also the form of the conductors connecting the magnets with the commutator of the pole changer, and in these connections, is located a multi-plex switch or controller adapted to be set so as to connect the said four wires of each cable in multiple, in multiple series, or in series, as desired. When connected in multiple, the four wires of each cable then become exactly like a single conductor of four times the cross section of one wire; when connected in series, they become like a single conductor of four times the length and four times the number of wire turns on the armature, thereby affording sixteen times as much resistance as when coupled in multiple; and when coupled in multiple series, the difference between the two extremes is divided. It follows, that the control of the car, in order to furnish power to meet the load or afford the desired speed, is furnished by the armature windings and the multi-plex switch, without the use of any dead resistance. When the armature windings are connected in multiple, the least resistance will be presented, and also the lowest number of ampere turns, and hence, the smallest amount of power from the dynamo will be consumed; and when the windings are connected up in series, the maximum resistance will be presented and the highest number of ampere turns, and hence, the greatest amount of power from the dynamo will be consumed. This variable armature winding, therefore, utilizes the constant current to the greatest possible advantage.

The car track is divided into blocks of a suitable length (say one mile, more or less), with the rails insulated from each other at the ends of the blocks. A third or conducting rail, made up of insulated sections, extends along the entire line of travel and is suitably supported from the ties in such a way as to be insulated from the ground. The field magnets are disposed in much the same way as before. The supply circuit from the generator or generators is a metallic circuit including automatic rheostats, located at the ends of each track block, the movable contacts of which are automatically operated by a magnetic device under the control of the car. As shown, a solenoid in a shunt from the main supply circuit is used for the purpose.

The car carries brushes which are normally in contact with the sectional third rail. The field magnets are so wound and connected into the supply circuit that there will be six magnets under the car, at any given instant of time, fully energized, and two sets of six more half energized, one set in advance and the other in the rear of the fully energized set. The field magnets are normally out of the supply circuit, but are connected therein by the car and the sectional third rail. The solenoid of each rheostat is connected with one of the track rails and the feed conductor of the supply circuit. Normally, the core of the solenoid is in its lowest position, and holding a bridging contact in position to connect into the supply circuit the lowest resistance of the rheostat. When the car comes onto the block controlled by that rheostat, the car connects the field magnets into the supply circuit, by completing a new or second path for the current, to-wit, from the supply conductor of the main circuit, through the field magnets to the third rail, and thence through the car brushes and truck to one of the track rails and over the solenoid shunt circuit, at the block tower, and around the rheostat resistance, in the main circuit, to the main supply conductor on the opposite side of the rheostat; and the instant that this occurs, a little of the current will pass through the solenoid magnet, thereby energizing the same and raising the core and the movable or bridging contact to its highest position, and this will bring into the main circuit a resistance, at the rheostat, much greater than that afforded by the connected in members of the field magnets and the car armature and its pole changer; and hence, thereafter the current from the supply circuit will be shunted through the field and the said electric devices on the car; and this will continue until the car reaches the end of the block. The same actions will be repeated when the car is on the next block.

It will be seen, therefore, that one of the radical features of improvement, in respect to the track and the field, is the division of the track into blocks with the automatic rheostats in the towers, at the heads of the block, for connecting in the proper sections of the field under the coöperation of the car. The automatic rheostats therefore mechanically connect but electrically separate feeding sections of the supply conductor and may be said to divide off the supply circuit into sections corresponding to the car track blocks.

For a long distance or standard railway, it is highly desirable to employ a comparatively large car, as compared with the ordinary street railway car. Hence, it is for this purpose essential that the armature on the car have great strength; or, in other words, the car armature must be large. To this end, there must be a large number of armature windings.

The rotary pole changer armature or, so-called magnetic driver has four pole pieces or magnet cores, two of which are north poles and two of which are south poles, and this polarity of the rotary pole changer is constantly maintained. The pole changer is so related to the field magnets that the said magnetic driver or pole changer armature makes a single revolution while the car passes over four field magnets. It follows that there must be four commutations for the car armature magnets in each revolution of the pole changer. This fact, taken together with the face that the armature has twelve poles and sets of windings each composed of a cable of four wires, requires the commutator to be double, or, in other words, to have ninety-six plates. The problem was to get any commutator of reasonably small compass which would do this work. If the commutator was made to revolve, as has been the practice hitherto, it would have been necessary to employ forty-eight collecting rings, two for each armature wire, which would make the pole changer of a size impracticable for electric railways. I solved the problem by making the commutator stationary, and double, and providing sets of traveling brushes carried by the pole changer shaft and made to travel around the commutator, under the rotation of the magnetic driver or armature of the pole changer. It was then possible to have employed two dis-similar brushes and two collecting rings, so far as the commutator is concerned. For convenience, however, I employ four brushes coupled up in pairs so that two opposite brushes are negative and two opposite brushes positive, with the positive and negative brushes separated by ninety degrees. This, so far as I know, is a new form of commutator, and is especially well adapted for a non-rotating armature like that used in my present system. This improved pole changer, including this new form of commutator, therefore constitutes another feature of my present invention.

In practice with my old system, I found that it was possible to stop the car in such a position that the magnetic driver or rotary armature of the pole changer would be on a dead center in respect to the underlying field magnet; and, of course, when in such position, the car could not be started with the electric current. Although this was something which would only rarely ever occur, it was desirable to provide for it, and hence, I now employ what I call, because of its function, an off-centering field and a small storage battery on the car, with the windings of said magnetic driver and the windings of said off-centering field connected into said storage battery circuit, and which circuit includes a hand action reversing switch. Said off-centering field is of less strength than one of the underlying field magnets, but is of sufficient strength to throw the magnetic driver or rotary armature of the pole changer off the dead center in respect to the field magnet, even when the field magnet is closed into the supply circuit. Hence, it follows that, by properly manipulating said reversing switch, the pole changer can always be brought into operative relation to the field magnets so that the car can always be started by the current. This off-centering field will, in practice, be so rarely ever called into action that a small storage battery is sufficient.

For some purposes, it is desirable to have the track or field magnets closed into the supply circuit, but the car armature to be cut out from said supply circuit. This might be so, for example, when the car is on a steep down grade, or is running on a level track, under the effect of its own momentum. It is then desirable to hold the car down onto the track. This I accomplish by providing a short circuiting path for the dynamo or main supply current which comes onto the car, and which returns this current without permitting the same to pass through the car armature or the commutator for the same. This short circuiting path is controlled by the movable contacts of the multi-plex switch, at the will of the operator, the parts being so arranged that when the said movable blades are in their normal or central position, between the opposite halves of the switch-board, the short circuiting path will be closed. These short circuiting devices, therefore, constitute another feature of the invention.

Respecting the blocks of the car track and the automatic rheostats located in the towers at the heads of the blocks, for controlling the field sections of that block, it should perhaps be also noted that, in practice, I provide an electric signal system supplied with current over shunt connections from the main circuit, and operating, under the control of the car, to indicate the condition of the blocks, to-wit, as to whether clear or occupied by a car, all as fully disclosed in my companion application executed and filed of even date herewith.

With the foregoing general statements in mind, it is thought that it will be easier to follow and understand the detailed description which will now be given.

Detailed description.

The invention is illustrated in the accompanying drawings wherein like notations refer to like parts throughout the several views.

Figure 10:
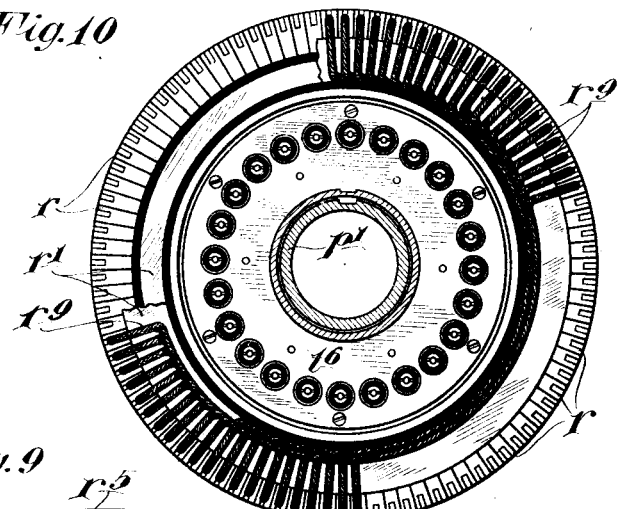
Figure 9:
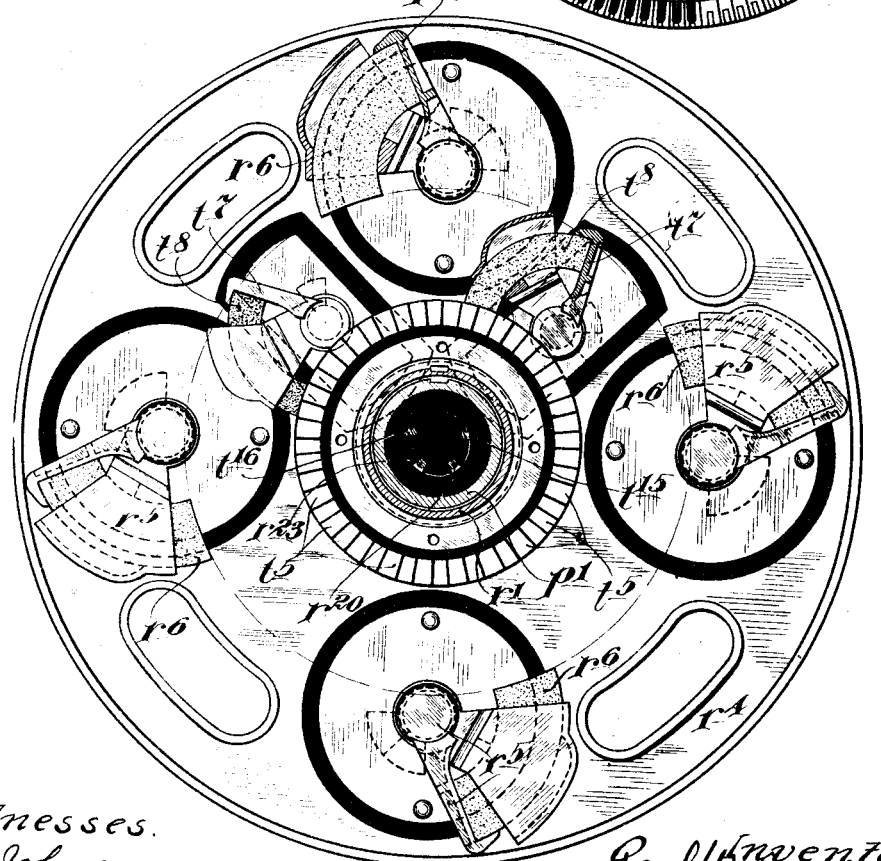

In the said drawings;

Figure 1 is a view in side elevation illustrating a car and part of the roadway organized in accordance with my invention. Fig. 2 is a view of some of the parts shown in Fig. 1, in right end elevation in respect to Fig. 1, with most of the car body broken away. Fig. 3 is a view in longitudinal vertical section through the car trucks and the road-bed, on the line $x^3$ $x^3$ of Fig. 2. Fig. 4 is a detail showing one of the crank shafts detached, in plan view, which crank shaft carries and operates the car brushes. Fig. 5 is a view taken through the pole changer and a part of the car truck in longitudinal vertical section, substantially in the same plane as shown in Fig. 3, but on a larger scale, and with some portions broken away. Figs. 6 and 7 are views in plan and elevation, respectively, illustrating chiefly in diagram the position and relation of the movable to the fixed parts of the multi-plex switch which is in the car armature circuits, and the position of the same on the car. Fig. 8 is a vertical section through the pole changer taken lengthwise of the pole changer shaft, but with some parts removed and others shown in elevation or plan, and some portions broken away. Fig. 8½ is a right end elevation of the parts shown in Fig. 8, with the housing removed and some parts broken away. Fig. 9 is a vertical cross section through the pole changer, on the line $x^9$ $x^9$ of Fig. 8, with the housing and the large commutator removed, and looking outward. Fig. 10 is a view of the large commutator detached and looking at its outer face, with some portions thereof shown in section and other parts being broken away. Fig. 11 is a cross section, on the line $x^{11}$ $x^{11}$ of Figs. 8 and 12, with the housing removed. Fig. 12 is a view in right side elevation with respect to Fig. 11, showing the collecting ring brush holders, located at the left end of the pole changer, as shown in Fig. 8. Fig. 13 is a diagram view illustrating the roadway, the field magnets, the supply circuit and the electric connections for the said parts as controlled by the car and the automatic rheostats at the ends of the blocks. Fig. 14 is a diagram view, with portions broken away, illustrating the opposite ends of the roadway and the field which extends along the line of travel and the supply circuit for the same. Figs. 15 and 16 are companion views constituting together a diagram illustrative of the wiring for the electric devices carried on the car, and for the immediately underlying portions of the field and the roadway. Fig. 17 is a view of a section of the roadway and field which abuts the left end of the roadway and field, as shown in Fig. 15. Fig. 18 is a similar view of a portion of the field and roadway which abuts the right end of the field and roadway shown under the car in Fig. 16. The portions of the roadway and field shown in Figs. 15 to 18 inclusive, may be assumed to be portions cut away and removed from the parts shown in Fig. 14, and coöperating with the said parts and others not shown to afford a complete line. Figs. 19 to 22 inclusive, are diagram views illustrating the connections between the car armature and its commutator, in four different positions of two sets of the movable blades of the multi-plex switch by which the windings of the armature are varied so as to couple the same in multiple, multiple series, or in series, as hitherto noted. Fig. 19 shows said windings coupled in multiple; Figs. 20 and 21 in multiple series and Fig. 22 in series. At the foot of each of the sheets containing said diagram views Figs. 19 to 22, appear small diagrams marked, respectively, 19ª, 20ª, 21ª and 22ª, intended to indicate to the eye the form of the armature winding couplings, represented in the main view on the same sheet, and thereby also serving to represent the different speed steps. Fig. 23 is a detail showing the movable contact blades and a number of the fixed contact blades of the multi-plex switch or controller, looking in the same direction as in Fig. 7, but with the said parts shown on a much larger scale. Fig. 24 is a left end elevation of one of the parts shown in Fig. 23. Fig. 25 is a diagram view illustrating the relation of the traveling brushes to the plates of the large stationary commutator of the pole changer and the wiring to and from these plates and between these brushes, with the full forty-eight wires shown which connect the commutator with the car armature windings through the multi-plex switch. Otherwise stated, instead of showing simply the twelve cables of four wires each, the whole forty-eight wires are shown as they lead out from the commutator, and the connections between the coöperating pairs of similar brushes. Fig. 26 is a detail showing the way in which the armature circuit wires are connected to the commutator plates.

Fig. 27 is a vertical cross section through one of the field or track magnets, other parts being removed or broken away. Fig. 28 is a detail in section, on the line $x^{28}$ $x^{28}$ of Fig. 27; and Fig. 29 is a transverse section, taken on the line $x^{29}$ $x^{29}$ of Fig. 19.

In reading these drawings, it must be noted that in the main diagram, made up of Figs. 15 and 16, and in the diagrams Figs. 19 to 22 inclusive, only one of each of the pairs of similar traveling brushes which coöperate with the plates of the large stationary commutator for the car armature is shown. The other two brushes, to-wit, one of each pair of similar brushes, were omitted in order to make the illustration more distinct. It has already been noted that two similar brushes instead of one are employed simply as a matter of convenience. The distribution would be the same in principle, if only two dis-similar brushes were employed.

*The track, field and supply circuit.*—Referring especially to Figs. 1, 2 and 3, and the diagram views Figs. 13 to 18, inclusive, $a$ represents the road-bed, $a^1$ the ties, $a^2$ the track rails and $a^3$ the insulated sectional third rail or conductor which, as shown, is supported from the ties by insulating pedestals $a^4$. The sections of the third rail $a^3$ are insulated from each other, as well as from the ground; and the track rails $a^2$ are insulated from each other, at suitable intervals, to divide off the car track and roadway into blocks of any desired length, as say a mile more or less. At the ends of these track blocks are located housings which may be towers $a^5$, such as shown in Fig. 14, in which towers are located automatic rheostats for properly directing the current of the supply circuit, under the control of the car, as will later more fully appear.

From a soft iron base bar $b$ secured to the ties $a^1$ rise the cores or pole pieces $b^1$ of the field magnets. These parts $b$ $b^1$ and the coils or windings (formed by turns of the wires $b^2$ and $b^3$, as will later appear) which coöperate with said cores $b^1$ to form the field magnets, are located centrally or midway between the two rails of the car track, as best shown in Fig. 2, and extend along the entire line of travel, with said field magnets preferably spaced apart from each other about two and one-half feet. The cores of the field magnets are so wound (by said wires $b^2$ and $b^3$) that adjacent magnets will have opposite polarity. The form of these windings can be more readily understood after noting the main parts of the supply circuit.

Referring to Figs. 13 and 14, $c$ represents a D. C. series wound dynamo or a set of dynamos coupled up in series, which dynamo is adapted to deliver current at a predetermined constant and low current (preferably of about 75 amperes), and is of the kind which is regulated automatically to vary the voltage as required to meet the load. For example, said dynamo may be of the kind and regulated in the same way as the dynamos which were formerly used for arc lights in the old Brush system. The outgoing branch or feed conductor of the supply circuit, is made up of sections $c^1$ which are mechanically separated at the rheostats, in the block towers, but are electrically connected by the contacts and resistance coils of said rheostats; so that these rheostats, at the block towers, are in the feeding branch of the supply circuit. $c^2$ represents the return conductor of said supply circuit and $c^3$ a suitable circuit breaking switch therein at the power house. The conductors $c^1$ and $c^2$ connect together, at the outer end of the line of travel, as shown in Fig. 14. Having further regard to the rheostats, in the block towers $a^5$, each section $c^1$ of the supply conductor, which enters a given tower, ends in a long terminal contact $c^4$, at the rheostat, and that section of said supply conductor $c^1$, which leads out from the tower, has located therein, at said rheostat, a series of resistance coils and contacts marked with the common reference $c^5$, all in series with each other and more or less of which are adapted to be connected with the terminal contact $c^4$, according to the position of a movable bridging contact $c^6$ which is carried by and insulated from the core of a solenoid $d$ suitably supported within said tower. Normally, the core of the solenoid $d$ is in its lowermost position, and, when so located, only enough of the coils $c^5$ will be connected into the supply circuit to afford a minimum resistance; and the normal path for the current of the supply circuit is through the said rheostats with minimum resistance. Otherwise stated, the conductors $c^1$, $c^2$ and the rheostat resistance contacts constitute a closed metallic circuit which affords a normal path for the supply current; and the current has no other path until a car comes on to a block, whereupon a new or easier path is afforded, as will presently appear.

Returning now to the magnetic field or track magnets extending along the line of travel, the cores or pole pieces $b^1$ are wound by two separate wires marked, respectively, $b^2$ and $b^3$, as best shown in Figs. 13 to 18, inclusive, and in Fig. 27. By referring to these views, especially Figs. 13 to 18, it will be seen that the wire $b^2$ taps the feed conductor $c^1$ of the supply circuit, and is then coiled or wound about the pole pieces $b^1$ of twelve field magnets, and then is connected to a section of the insulated third rail $a^3$; and it will also be seen that the coils of said wire $b^2$, about the pole pieces $b^1$ of said successive field magnets, are right and left, or in opposite directions so as to make the polarities of the adjacent field magnets opposite. The same statement applies to the wire $b^3$; but it must be observed that the connections of these two wires $b^2$ and $b^3$ to the feed conductor $c^1$ of the supply circuit and to the sectional third rail $a^3$ are at different points, lengthwise of the roadway, and, as shown, these points are separated from each other by six field magnets. Otherwise stated, said connections of the field magnet windings or wires $b^2$ and $b^3$, out of which said windings are formed, are staggered, lengthwise of the roadway, in such a manner that both of said wires are closed into the supply circuit simultaneously on the cores of six magnets and separately each on six more magnets; and hence, it follows, that six magnets under the car will be fully energized and two sets more of six magnets each will be half-energized, to-wit, one set thereof forward and the other rearward of the fully energized set of six magnets. This staggered relation of said field magnet winding wires $b^2$ and $b^3$ can best be seen on Figs. 14 to 18, inclusive.

From the foregoing, it will be seen that the field or track magnets are always connected with the feed conductor $c^1$ of the supply circuit, but that no current can pass through said field magnets until a car comes onto the block, for the reason that the field circuit is kept open by the insulated sections of the insulated third rail $a^3$. When a car comes on to the block, it forms a bridging connection between said third rail $a^3$ and one of the track rails $a^2$, as will presently appear; and, when this occurs, the eighteen field magnets under the car will be connected into the supply circuit. The magnetic field extending along the line of the track is, therefore, made up of short sections, including only eighteen field magnets each; and it is only one of these sections on any track block, to-wit, the field section under the car which is closed into the supply circuit at any one time. It will be understood, therefore, that there are several field sections in each track block. Nevertheless, the rheostats at the block towers, in coöperation with the car, control the connecting in to the suppy circuit of the successive field sections which come under the traveling car, as will now be noted.

A wire $d^1$, as shown best in Fig. 13, connects the outer member of the track rail with the magnet of the solenoid $d$ of the automatic rheostat, in the block tower which controls the field sections on that block of the track. From the magnet of the solenoid $d$ extends a series of leads to corresponding contacts marked with the common reference letter $d^2$, which parts $d^2$ coöperate with a bridging contact $d^3$, carried by and insulated from the core of said solenoid, to connect the proper member of said parts $d^2$ with a terminal contact $d^4$ at the rheostat end of a wire $d^5$ which leads out from the rheostat and tower to a junction with the feed conductor $c^1$ of the supply circuit on the opposite side of said rheostat. The magnet of the solenoid $d$ is wound with coils of different cross section, and these are tapped by the members of the leads $d^2$ having a corresponding cross section, thus affording paths of varying capacity as required to take care of the varying current which passes over the solenoid circuit. When the bridging contact $d^3$ is in its lowermost or normal position, as shown in the rheostat at the right in Fig. 13, the lead $d^2$ of the smallest cross section will be connected into the solenoid circuit; and as the said bridging contact $d^3$ is raised, one step after the other, leads $d^2$ of greater cross section will be successively connected into the solenoid circuit, until the limit is reached when said bridging contact is in its highest position, as shown in the rheostat at the left in Fig. 13; and, when said parts are in this position, the conductors of the solenoid circuit will be of sufficient cross section to carry and will carry substantially the whole of the current from the supply circuit, as will later more fully appear.

The car body $e$ and the car trucks $e^1$ are, or may be, of any suitable construction adapted to support the non-rotary armature with its pole pieces in position to travel in close proximity to the pole pieces $b^1$ of the field or track magnet. As shown, there are three sets of brushes $e^2$ carried by the car; one located at the center and one near each end of the car body. The central brush is supported directly from the car body $e$ and is always in contact with the insulated sectional third rail $a^3$. The said end brushes $e^2$ are carried by suitable hangers $e^3$ depending from the crank arms $e^4$ of hand controlled rock shafts $e^5$ suitably journaled one on each side of the car body, as best shown in Figs. 1 and 2. Of said two end brushes, one is in contact with said sectional third rail and the other is held up out of contact therewith. As shown in Fig. 13, the end brush at the left is the one which is down in contact with said third rail and the end brush at the right is raised up out of contact with said rail. Generally stated, the end brush nearest to the rheostat controlling the field sections of the track block occupied by the car is the one which must be down. It will be seen, therefore, that there are always two of the car brushes $e^2$ in contact with said sectional third rail.

Referring back now to Fig. 13, it can be seen that whenever a car comes onto a given block of the car track, the field circuit will be completed by the car, so that the current can pass through the field magnets to the sectional third rail and thence through the car and down to one of the car track rails, which, as shown, is the outer rail, and further, that the current can pass thence over the solenoid circuit and back to a junction with the feed conductor $c^1$ of the main supply circuit. Hence, as soon as the car closes the field circuit, a small portion of the main supply current can pass over the solenoid shunt circuit, even while the bridging contacts $c^6$ and $d^3$ remain in their lowermost position, as shown in the rheostat at the right in Fig. 13, because only the minimum resistance is then in the normal path of the current at the rheostat. It, therefore, follows that the solenoid magnet in the rheostat controlling the field of the given block will be energized instantly, as soon as the car comes on to that block, and, hence, that the core of the solenoid will be raised to its limit and carry with it the bridging contacts $c^6$ and $d^3$, so as to bring these parts into the position shown in the rheostat at the left in said Fig. 13; and as soon as this occurs, it is obvious that the bridging contact $c^6$ will bring into the feeding side of the supply circuit the maximum resistance or number of coils $c^5$, at the rheostat, and that the bridging contact $d^3$ will be in position to coöperate with the coils of the solenoid magnet and leads $d^2$ of greatest cross section. The said maximum resistance, which is connected in to the feeding side of the main supply circuit at the rheostat, when the bridging contacts thereof are in their uppermost position, is greater than the resistance afforded by the connected in section of the field, the car armature magnets, and the pole changer on the car; and, hence, as soon as this maximum resistance is connected in to the supply circuit at the rheostat of the given block, the current of the supply circuit will take the easier path through the field or track magnets to the sectional third rail, and thence through the pole changer and non-rotating armature of the car and back to the outer member of the track rails, and thence over the solenoid shunt circuit and back to the outleading or feed conductor $c^1$ of the supply circuit. The solenoid shunt, therefore, becomes part of the working path for the supply current, when the car is on the track block controlled by that rheostat.

With the system organized as illustrated, the car track block is at the right of the tower, having the automatic rheostat controlling the field sections in said block, as shown in Fig. 13; and, hence, the car shown in said view is controlling the rheostat at the left of the car. Before a car reaches any given track block, the parts of the automatic rheostat in the tower for that block stand related, as shown at the right hand rheostat in said Fig. 13. As soon as the car passes off from a given track block, the field, and, hence, the solenoid shunt circuit of that block, will be open and the solenoid magnet will be instantly deënergized and, hence, its core will drop, thereby bringing the bridging contacts $c^6$ and $d^3$ of the rheostat back to their lowermost or normal position and thereby reëstablishing the normal path for the current of the supply circuit through the minimum resistance of said rheostat.

From what has so far been said, in this detailed description, the roadway structure, the magnetic field extending along the entire line of travel, the supply circuit connections for the same, and the means by which these become active under the control of the car are probably clear. It remains to describe the electric devices, which are carried on the car, and the supply connections for the same, which will be done under the next heading. Before leaving the field and roadway, however, it is desirable to note a few more details in respect to the track and field magnets and the supply circuit. The base bar $b$, from which the cores or pole pieces $b^1$ of the field magnets rise, are of the proper construction to afford seats for two cement or porcelain troughs $b^4$, as shown in Fig. 27, extending along the entire line of travel, and in one of which troughs are located the main section $c^1$ of the outleading or feed conductor $c^2$ of said supply circuit; and the trough for the feed conductor $c^1$ is of the proper form to permit the said conductor to be tapped, at the proper points, by the wires $b^2$ and $b^3$, which are wound about the poles or cores $b^1$ for coöperation therewith to form the field magnets, as hitherto described. A porcelain or cement casing $b^5$ slips over each field magnet and rests on the top of the cement or porcelain troughs $b^4$. A flanged soft iron cap $b^6$ snugly fits over the top of the pole piece $b^1$, with its flange embracing the upper end of the casing $b^5$; and this is rigidly secured to and drawn into close contact with the pole piece $b^1$ by a soft iron bolt $b^7$ extending through the parts $b^6$, $b^1$ and $b$, as shown in Fig. 27. The head of the bolt $b^7$ is counter-sunk in the cap $b^6$ and its lower screw-threaded end is fitted with a nut $b^8$ and a wedge block washer $b^9$, which fits into a corresponding seat $b^{10}$ formed on the under side of the bar $b$ in such a way as to afford clearance for some adjustment, so as to thereby make it possible to compensate for wear and tear and be able to tightly clamp the cap $b^6$ to the pole piece $b^1$ under the action of the nut $b^8$. The head of the washer is provided with flange sections $b^{11}$ which can be turned down to embrace the sides of the nut $b^8$ and serve as a nut lock, all as shown in Figs. 27 and 28. The supply circuit conductors $c^1$ and $c^2$, and the field magnet windings are shown as embedded in pitch, or other suitable insulating material $b^{12}$. The soft iron cap $b^6$, applied as described, becomes of course a part of the pole pieces of the field magnet and is the part which directly underlies and is, therefore, nearest to the depending pole pieces of the car armature.

The details described in the last preceding paragraph do not, of course, constitute any essential part of the invention, but have been illustrated and noted simply to make clear the way in which the field magnets and the supply conductors for the same are protected in commercial practice.

*The electrical devices on the car.*—It has already been noted that the non-rotating armature on the car is supported from the car trucks in such a way that its pole pieces will travel in proximity to the pole pieces of the track or field magnets. The core of this car armature is composed of laminated soft iron (as shown in Fig. 29) so constructed as to afford a main horizontal body $f$ and projecting pieces $f^1$ spaced apart from each other and depending downward from the body $f$. The core $f$ $f^1$ is constructed in sections, which are flexibly connected by ball and socket, or other suitable joints $f^2$. The windings $f^3$ and $f^4$ are applied around the body $f$, in the spaces between the depending parts $f^1$, and, hence, the depending parts $f^1$ become the pole pieces of the car armature magnets. The cables which lead to and from the said windings $f^3$ and $f^4$ and, by turns of which cables said windings are formed, are marked, respectively, with the same reference letters as the said windings; and said cables lead out from and back to certain of the fixed contacts $k$ of the multi-plex switch located in the connections between the car armature and its commutator. There are six sets of the windings $f^3$ and six sets of the windings $f^4$, and each of said sets of windings $f^3$ and $f^4$ is made up of six windings of the respective cables. The current goes in opposite directions through the windings $f^3$ and $f^4$. The respective sets of windings $f^3$ and $f^4$ abut or follow each other on the core $f$ $f^1$ of the armature, thereby producing the two opposite poles in that section of the core. Hence, there are six north and six south poles on the entire armature; otherwise stated, said windings $f^3$ and $f^4$ are so applied as to produce twelve poles on said car armature, as best shown in Figs. 16, 19, 20, 21, 22 and 24.

The commutator for the car armature constitutes a part of the pole changer illustrated in Fig. 8, and the segments of this commutator are marked with the reference $r$; and this commutator is represented in diagram at the left end of Fig. 15. The segments $r$ of this commutator are connected by cables $g$ with certain members of the fixed contacts $k$ of the multi-plex switch. Said cables $g$ connect with said commutator segments $r$ by means of coupling $r^{24}$ and ship contacts $r^{25}$, as shown in Figs. 8 and 26.

The movable blades $k^1$ of the multi-plex switch serve to connect the proper members of the fixed contacts $k$, so as to effect the proper distribution of the current supplied over the commutator cables $g$ in such a way that one-half of the current will pass through the armature windings $f^3$ and the other half will pass through the armature windings $f^4$; and, further, that, under the commutations of the current, the directions of the current through the said coils $f^3$ and $f^4$ will be progressively and successively changed according to the speed of the car. To properly effect this distribution, in either direction of the car's travel, the fixed contact board of the multi-plex switch may be said to be double or to have two sides which, as shown, are spaced apart from each other a distance a little greater than the length of the movable blades $k^1$, as shown in the diagram views Fig. 15 and Figs. 19 to 22, inclusive; and, for convenience of statement, the side at the top of the said views may be called the upper and the other the lower side of said contact board of the multi-plex switch. Considering either side of this fixed contact board of the multi-plex switch, it will be seen that there are twelve sets of thirteen fixed contacts $k$ in each set, with which fixed contacts four of the movable blades $k^1$ coöperate; and, hence, four movable contact blades $k^1$ and thirteen fixed contacts $k$ constitute a unit or section of the multi-plex switch, and of these twelve sections or units, the six units at the left, in respect to Fig. 16, may be said to be in series and coöperating to effect the distribution of the current over all the cables of the armature windings $f^3$; and the six units at the right may be said to be in series and coöperating to effect the distribution through all the cables and windings $f^4$ of the armature. To this end, the current which comes into the switch, at any one time, from the commutator, over one of the cables $g$, is divided at the multi-plex switch so that one-half thereof goes through the left and six sections or units and the other half through the right hand six sections or units.

The conducting cables $g$ from the commutator to the multi-plex switch, and the cables $f^3$ and $f^4$, leading to and from the multi-plex switch and forming the windings $f^3$ and $f^4$ of the armature, are each composed of a plurality of wires; to-wit, as shown, each of said cables $g$, $f^3$ and $f^4$ is composed of four wires; and the contacts of the multi-plex switch are sufficient in number and so related that the four wires of each of said cables $f^3$ and $f^4$ can be connected up with the wires of the cable $g$ in multiple, in multiple series or in series, at the will of the operator, by properly setting said movable blades $k^1$ of said switch.

The movable blades $k^1$ of the multi-plex switch are carried by bar $k^2$ composed of insulating material and secured to a sliding carriage $k^3$ mounted to move lengthwise of the car and crosswise of the switch-board, between guides $k^4$ fixed to the under side of the car body, as best shown in Figs. 6 and 7. The carriage $k^3$ is connected by rods $k^5$ to the crank arms $k^6$ of a pair of hand levers $k^7$ located one on each of the vestibule platforms of the car. Hence, the movable carriage $k^3$, carrying the movable blades or contacts $k^1$ of the multi-plex switch, is subject to the control of the motorman from either end of the car.

Let it be assumed that the diagrams, Figs. 16 and 19, show the position of the contacts of the multi-plex switch for connecting up the wires of said cables and armature windings in multiple, and that the supply current is coming from and returning to the commutator over members of the cables $g$ having the arrows therein. Under this assumption, the current will be supplied to the left hand unit or section of the lower half of the switch-board over the wires of said cable $g$, and will there divide, one-half being distributed to the cables and windings $f^3$ through the left hand six units, and the other half of said current passing to a coupling wire $g^2$ which will take the same over to the right hand unit or section of the lower half of said switch-board for distribution by the right hand six units to the cables and windings $f^4$. The current distributed by the left hand unit of the switch-board goes out over all the wires of the cable $f^3$ and thence through all the six windings $f^3$ formed by that particular cable on the car armature core $f$ $f^1$ and then comes back to the other proper contacts of said left hand unit of the switch-board, and goes on over coupling wire $g^1$ to the proper contact of the next inward adjacent unit of the switch-board; and so on, through the wires of the successive cables and windings $f^3$ and the successive left hand six units of the switch-board, and finally out over a central cable $g^3$ to the proper return cable $g$ of the commutator. The other half of the current which passed on over the coupling wire $g^2$ to the right hand unit of said switch-board is distributed, through the proper contacts thereof, to all the wires of the cable $f^4$ and all the six windings thereof on the armature core, and back to the proper contacts of said right hand unit of the switch-board; whence the current passes on over coupling wire $g^1$ to the next inward adjacent unit of said switch-board and out to the wires of the next set of cables and windings $f^4$, and so on through all six of said right hand units until it is also carried off from the sixth unit of that right hand set, over the central cable $g^3$ to the proper return member of the cables $g$, leading back to the commutator. From this, it will be seen that, with the multi-plex switch having its movable blades set, as shown in Figs. 16 and 19, the coupling of the four wires making up each of the cables $g$ and $f^3$ and $f^4$ is in multiple; or precisely the same, so far as the armature is concerned, as if the four wires making up the cables $f^3$ and $f^4$ were composed of single wires of four times the cross section of each of the four wires of the cable. It may further be noted that this coupling, therefore, affords the largest available conductor for the current from the supply circuit with the minimum number of wire and ampere turns on the armature core; and, hence, that the constant current (75 amperes) will be forced therethrough by the dynamo at minimum voltage.

In respect to the diagram made up of Figs. 15 and 16, it must be noted that the cables $f^3$ and $f^4$ make two turns each around the body portion $f$ of the core of the armature between adjacent projecting pole pieces $f^1$; and, as each of these cables is composed of four separate wires, these two cable coils between each pair of pole pieces $f^1$ are composed of eight wire coils; and that in Fig. 19 the diagram is carried out in such a way as to show the four wires of the cables which are connected up in multiple, by the multi-plex switch, and the eight wire and ampere turns which are made about the body portion $f$ of the armature core by two turns each in the four separate wires. Being connected in multiple, the current passes in equal portions over all four of the said wires, as shown by the arrows in the coils on said Fig. 19. It will be further observed that in the diagrams of Figs. 16 and 19, the movable blades of the multi-plex switch have been moved downward from their normal or idle position one step only. In respect to Fig. 19, it must further be noted that only the left hand two units or sections of the switch-board are illustrated, and hence, the multiple coupling is shown only for two of the cables and coils $f^3$; and, of course, the current is coming from and returning to the commutator over only one of the cables $g$ connecting the commutator with said multi-plex switch, to-wit, the four wires making up one of these cables and having therein the arrows, on said Fig. 19. The half of the current which divides at the point where it first reaches the multiple-switch, at the left hand unit thereof, passes thence over the switch coupling wire $g^2$ to the right hand member of the sections or units appropriated to the cables and coils $f^4$, but the coupling connections for the cable and coils $f^4$ are not shown in Fig. 19; neither is the return wire $g^3$ shown by which the current gets back from the central part of the multi-plex switch to the return member of the cable $g$ leading to the commutator. This remark applies to all the additional views, Figs. 20, 21 and 22 showing the additional successive steps of coupling at the switch for the armature windings. This form of armature winding coupling, illustrated in Fig. 19, is represented to the eye in the small diagram 19$^a$ on the same sheet, and is the coupling of the armature windings which is employed when starting the car or before there is any tendency to C. E. M. F., and, hence, this may be called the first speed or starting step.

Fig. 20 represents the next step or change in the form of armature winding coupling which follows after the step shown in Fig. 19, to increase the speed or power; and shows one form of the multiple series couplings; and, by inspection of said diagram, it will be seen that the movable blades have moved downward one step farther than in Fig. 19. This shift of the movable blades has the effect of coupling the four wires of the cables and coils $f^3$ and the four wires of the cables and coils $f^4$ to the wires of the cable $g$ leading from the commutator in multiple series of the form indicated in Fig. 20$^a$; or, otherwise stated, this coupling has the effect of splitting the cables $f^3$ and $f^4$ each into two equal parts of two wires each of double the length of the said cables, where coupled as shown in Fig. 19, and to increase the number of ampere turns about the core of the armature two-fold.

Fig. 21 represents the next or third step of the couplings, or the next step following that shown in Fig. 20, for increasing the speed or power; and by inspection of this diagram, it will be seen that the movable blades of the switch have been moved downward one step farther than in Fig. 20. This shift has the effect of coupling the wires of the cables and coils $f^3$ and $f^4$ to the wires of the cable $g$, leading from the commutator, in multiple series of the form shown in small diagram Fig. 21$^a$; or, otherwise stated, two of the four wires making up the cables and windings $f^3$ and $f^4$ are in multiple with each other, and the other two in series, and the two in multiple are in series with the two in series. The number of ampere turns secured on the armature core from the wires of the cables $f^3$ and $f^4$ has, in Fig. 21, been further increased one-third as compared with Fig. 20, or three times the number secured by the couplings shown in Fig. 19.

Fig. 22 represents the next or fourth step of the couplings or the next step following that shown in Fig. 21, for increasing the power or speed; and, by inspection of this diagram Fig. 22, it will be seen that the movable blades of the switch have been moved downward one step farther than in Fig. 21. This shift has the effect of coupling the wires of the cables and coils $f^3$ and $f^4$ with the wires of the cable $g$, from the commutator, in such a way that the wires of said cables and windings will be in series with each other, as illustrated in the small diagram view Fig. 22$^a$; and, hence, the number of ampere turns will be increased one-third as compared with Fig. 21, or twice as compared with Fig. 20, and fourfold as compared with Fig. 19; or, to use a concrete example, assuming that the ampere turns with the couplings in multiple, as shown in Fig. 19, are 40 in number, then the ampere turns with the couplings as shown in Fig. 20 will be 80 in number, and with the couplings as shown in Fig. 21 the ampere turns will be 120 in number; and with the form of coupling shown in Fig. 22 the ampere turns will be 160 in number. From the foregoing, it is, of course, obvious that the constant current (75 amperes), has a conductor of largest cross section or easiest path when the coupling is in multiple or at the first speed step, and that the cross-section of the conductor is gradually decreased and hence the resistance increased until at its maximum, when the armature windings are coupled in series, or at the fourth speed step, as shown in diagram 22. Inasmuch as the dynamo furnishing the current to the supply circuit is regulated for voltage, as hitherto noted, so as to vary the same according to load, the voltage will increase as the shift is made, from the coupling in multiple to multiple series and thence to series, in the order described, so as to give the increased power required. It will thus be seen that there is no loss of energy through the use of any dead resistance. This automatic increase of the voltage of the supply current will be in proportion to the increase of resistance, afforded by the different forms of the armature windings, and in proportion to the increase of the C. E. M. F. produced thereby.

The successive shifts of the movable blades of the multi-plex switch, illustrated and described with reference to Figs. 15 and 16 and 19 to 22 inclusive, start the car from a standstill and bring the same up to maximum speed.

Directing attention now more particularly to Figs. 5 and 8 to 12 inclusive, the diagram views Figs. 15 to 22 inclusive and Fig. 25, the parts of the rotary pole changer, including said commutator for the car armature, hitherto several times referred to, will now be explained. In addition to the said commutator for the car armature, the pole changer has another and relatively small commutator in the circuit connections for the off-centering field, for the rotary magnetic driver or armature of the pole changer referred to in the introductory general statement, and for distinction and brevity of statement, it wil be convenient to call the commutator for the car armature the large commutator and the commutator for the off-centering field the small commutator. The segments of both of said commutators occupy a stationary position, being suitably supported from the bearing framework and housing $q$ of the pole changer. The cores or pole pieces $p$ of the pole changer armature, or magnetic driver, radiate from a common hub which is fixed to the hollow pole changer shaft $p^1$, as best shown in Figs. 5 and 8. There are four of these pole pieces or magnet cores $p$, equally spaced apart from each other and so wound by coils of a cable or wire $p^2$ as to form two opposite south poles and two opposite north poles. The framework and housing $q$ is suitably secured to one end of the car armature in such position that the pole pieces $p$ of the magnetic driver, or pole changer armature, will be subject to the underlying track magnets making up the magnetic field which extends along the line of travel, and, under the effect of these track or field magnets, rotary motion will be imparted to the said magnetic driver according to the speed of the car. The plates $r$ of the large commutator are carried by a hub $r^1$ which projects from a disk $r^2$, which hub and disk encircle the shaft $p^1$ of the pole changer, as best shown in Fig. 8, and this disk has its lower edge mounted in a flanged segmental guide $r^3$ which rises from the framework $q$ of the pole changer, as shown in Fig. 8, and the said hub $r^1$ and disk $r^2$ are angularly adjustable in the said guide $r^3$, to vary the positions of the commutator segments $r$ as required to afford any lead desired.

At its right hand end, in respect to Fig. 8, the pole changer shaft $p^1$ is provided with a disk $r^4$ which carries four counterweighted brush holders $r^5$, suitably supported in and insulated from the said disk $r^4$, and which brush holders $r^5$ carry corresponding brushes $r^6$ which are held in yielding contact with the segments $r$ of the large commutator by torsional springs $r^7$, each having one end applied to the brush holder shaft and the other to the bearing support for the same, which is carried by the disk $r^4$, as shown in Fig. 8. Inasmuch as the disk $r^4$ is fixed to the pole changer shaft $p^1$, it is, of course, obvious that it will rotate therewith and, hence, that the brushes $r^6$ carried thereby must travel around the commutator segments. Of the said four brushes $r^6$, two opposite members are positive and coupled together and two opposite members are negative and coupled together, so that the four practically operate like two dis-similar brushes in the coöperation with the segments $r$ of the commutator to effect the distribution of the current to the car armature and to commutate same as required. In Fig. 8, two of these coupled similar brushes are shown, and in Fig. 8½ and Fig. 9 all four of the coupled brushes are shown; and the coupling cables which connect similar brushes are marked $r^8$. The pole changer armature or magnetic driver $p$ $p^1$ $p^2$ is so related to the underlying track or field magnets that the said driver will make only one revolution while the car passes over four field or track magnets, thus causing two similar poles of said driver to pass two similar poles of said field or track magnet; and it, therefore, follows that there must be four commutations of the current in the same path, for the car armature magnets, in each revolution of said pole changer. The large or car armature commutator is, therefore, made double. This fact, taken together with the further fact that the car armature has twelve poles and twelve sets of windings each composed of a cable of four wires adapted to be variably coupled together by the multi-plex switch with the cables of four wires each connecting said switch with the commutator, requires said large commutator to have ninety-six segments $r$. Opposite members of said segments $r$ are coupled together by internal wires $r^9$, as shown in Figs. 15, 8, 8½, 10, and in the diagram views 15 and 19 to 22 inclusive, and Fig. 25. The coupled pairs of similar brushes are opposite to each other, and the dis-similar brushes stand 90 degrees apart from each other. The commutations are, therefore, over segments $r$ which are 90 degrees apart. The opposite or left end of the pole changer shaft $p^1$ carries a pair of collecting rings marked $r^{10}$ and $r^{11}$, respectively, suitably supported and insulated from their supports and from each other. The rings $r^{10}$ and $r^{11}$ are the opposite extreme members of the five rings shown at the left in Fig. 8. With said rings $r^{10}$ and $r^{11}$ coöperate a corresponding pair of stationary brushes and holders marked with the common reference letters $r^{12}$ and $r^{13}$. The brushes and holders $r^{12}$ coöperate with the collecting ring $r^{10}$ and the brushes and holders $r^{13}$ coöperate with the collecting ring $r^{11}$. The said brush holders $r^{12}$ and $r^{13}$, as well as three others which will presently be noted, are all mounted on and insulated from a supporting stud shaft $q^1$ projecting from the housing $q$ of the pole changer directly over and parallel with the shaft $p^1$ thereof, as best shown in Figs. 8 and 11.

A slip contact pin $r^{14}$ connects the collecting ring $r^{10}$ with a coupling block $r^{15}$, and this is connected by a rod $r^{16}$ with an annular flange or band $r^{17}$ formed on the hub of the pole changer armature or magnetic driver; and this band $r^{17}$ has a pair of studs $r^{18}$ to which the opposite ends of the wire $p^2$, forming the coils or windings on the pole pieces $p$, are connected, the said windings $p^2$ thus being all connected in series. Said band $r^{17}$ is also provided with a radial rod $r^{19}$ extending into and insulated from the hollow shaft $p^1$ of the pole changer, and there forming a junction with a rod or cable $r^{20}$. Said rod or cable $r^{20}$ extends through and is insulated from said shaft $p^1$ and has its right end connected to one of the brush holders $r^5$ of a coupled pair of the traveling brushes $r^6$, as shown in Figs. 8 and 8½. The left end of said rod or cable $r^{20}$ extends radially out through the shaft $p^1$ to a coupling contact $r^{21}$ connecting the same with a slip pin contact $r^{22}$ which leads to a collecting ring $r^9$, for purposes which will later appear.

The car $e$ carries brushes $e^2$ in contact with the sectional third rail $a^3$, as hitherto described. The inleading conductor from the said car brushes $e^2$ to the pole changer on the car is marked $s^1$, and the pole changer end of this wire $s^1$ connects to the brush holder $r^{12}$, the brushes of which work on the collecting ring $r^{10}$, as shown in Fig. 8; and hence, the dynamo current can thus reach the said collecting ring $r^{10}$, and will pass thence over the conducting elements $r^{14}$, $r^{15}$ and $r^{16}$ to the flange or band $r^{17}$ of the magnetic driver, and thence through the coils $p^2$ on the poles $p$ of said driver, and out from the opposite end of said band $r^{17}$, through the short radial rod $r^{19}$, to the cable or rod $r^{20}$ which leads to one of the brush holders $r^5$ of a pair of the coupled brushes $r^6$, as above noted, and thus, through said coupled brushes, reaches the proper commutator segments $r$; and, thence, the current passes over the proper member of the cables $g$ to the fixed contacts $k$ of the multi-plex switch and by the switch is distributed to the cables and windings $f^2$ and $f^3$ of the car armature; and, on its return, said dynamo current will come back from the switch over the central cable $g^3$ to the proper return member of the cables $g$ and be carried thereby to the proper commutator segments $r$ coupled together by the internal connections $r^8$. Thence it will be carried off by the return pair of coupled brushes $r^6$ and their holders $r^7$ to the cable $r^{23}$ which leads to the collecting ring $r^{11}$, as shown in Figs. 8 and 8½; and from said ring $r^{11}$ the current will be taken off by the brushes and holders $r^{13}$ and be delivered to conductor $s^2$ leading from said brush holder $r^{13}$ and to the car trucks, whereby the current can reach the outer member of the track rails $a^2$ and pass thence over the solenoid shunt to a junction with the feeding side of the main supply circuit extending along the line of travel.

The inleading section $s^1$ of the main supply or dynamo current circuit on the car is shown as provided with a circuit breaking switch $s$ on the car, for the obvious purpose of permitting this current to be cut out from the car, at the will of the operator.

The foregoing description traces the dynamo or main supply current from the source of supply onto the car, through the pole changer, including the commutator for the car armature, to the multi-plex switch and the car armature windings and back through the pole changer to the car trucks and the solenoid circuit which returns the same to the advance section of the feeding side of the main supply circuit. From the description given, it will be seen that, by making the commutator segments for the car armature stationary and providing the shaft of the pole changer with traveling brushes, which coöperate with said stationary commutator segments, the desired distribution and commutation of the current is effected through the large number of armature windings with the use of only two collecting rings for the commutator; and, hence, it has been possible to get the pole changer into compact compass or of available working size. This would not have been possible, if the commutator segments had been mounted for rotary motion to coöperate with stationary brushes in the usual way, because this old or standard construction would have required forty-eight collecting rings and made the pole changer too large for practical use on an electric car.

The mechanisms so far described constitute an operative system; but, as noted in the introductory general statement, certain additional features are provided, such as the off-centering field for the rotary armature and the magnetic driver of the pole changer, and the short circuiting path for the dynamo current which comes onto the car. Said off-centering field and its supply connections will first be considered. The core of this off-centering field is composed of a segmental soft iron rod $t$ having radial projections $t^1$ between which are the windings $t^2$ which coöperate with the said core; and these field devices are so supported that the projections or pole pieces $t^1$ of said field will stand close to the path of the outer ends of the pole pieces $p$ of the pole changer driver. The said windings $t^2$ are formed by turns of a series of wires $t^3$, the opposite end members of which windings are connected by wire $t^4$, because the core is not a complete circle but only a segment thereof. Said core has twenty-four of the windings or coils $t^3$ so applied as to produce two poles, one north and one south. The segments $t^5$ of the small commutator for this off-centering field are supported in a hub $i$ which is rigidly but detachably secured to a larger hub $r^1$ which supports the segments $r$ of the large or car armature commutator, as best shown in Fig. 8. Inasmuch as the driver or armature of the pole changer makes only a single revolution while the car passes over four field magnets, thus causing two similar poles of said driver to pass two similar poles of said field magnets in each revolution of said driver, it follows that there must be four commutations of the current over the same path to the windings of said off-centering field, in each revolution of said driver. Otherwise stated, the same thing applies here as was explained while describing the large or car armature commutator. It follows, that the number of the small commutator segments $t^5$ must be double the number of the winding $t^2$, or 48 in number; but, inasmuch as two opposite members of the commutator segments $t^5$ are coupled together by internal connections $t^{2\,1\text{-}2}$, twenty-four of the wires $t^3$ serve to connect the commutator with the windings $t^2$ of the off-centering field. The disk $r^4$ at the right end of the pole changer shaft $p^1$ and which carries the brush holders $r^5$ and brushes $r^6$ for the car armature commutator, as hitherto described, also carries a single pair of counter-weighted dis-similar brush holders $t^7$ and brushes $t^8$, as shown in Figs. 8½, 9 and 15; and these brushes $t^8$ engage with and travel around the segments $t^5$ of the small commutator, and coöperate with said segments to commutate the current over the wires $t^3$ and through the coils $t^2$ of the off-centering field, according to the speed of the car. Said brush holders $t^7$ are subject to torsional springs, not shown, but which are the same kind and applied thereto in the same way as the springs $r^7$ are shown applied (Fig. 8) to the brush holders $r^5$ of said large commutator, as hitherto noted; and, hence, the brushes $t^8$ will be yieldingly held in contact with the segments $t^5$ of the small commutator.

The pole changer shaft $p^1$ carries at its left end, with reference to Fig. 8, a series of three collecting rings marked, respectively, $t^9$, $t^{10}$ and $t^{11}$; and on the stationary stud shaft $q^1$ are located a corresponding set of stationary brush holders and brushes marked, respectively, $t^{12}$, $t^{13}$ and $t^{14}$ which coöperate with said collecting rings to distribute the current, which is supplied to the off-centering field from a small storage battery $z$ located on the car. The connections are such that the current from the storage battery $z$ also goes through the coils $p^2$ of the magnetic driver or pole changer armature and is supplied thereto over the same conductor $s^1$, brush holders and brushes $r^{12}$ and ring $r^{10}$ which takes in the current from the dynamo or main supply circuit both to the said pole changer coils $p^2$ and thence through the large commutator to the car armature, as hitherto noted. Otherwise stated, the out-leading conductor $z^1$ from the storage battery $z$ forms a junction with the main supply circuit conductor $s^1$ at the point $z^3$, as shown in Fig. 15. The current from the two sources then pursues a common path until it passes through all the coils $p^2$ of the magnetic driver and comes out over the radial contact rod $r^{19}$ to the rod $r^{20}$ located within the hollow pole changer shaft $p^1$, as hitherto noted; whereupon the main or dynamo current goes on over the right end portion of the rod $r^{20}$ and through the large commutator to the car armature, as hitherto traced, and the battery current passes over the left end portion of the rod $r^{20}$, the coupling $r^{21}$ and the slip contact $r^{22}$ to the ring $t^9$; and from this ring $t^9$ the battery current reaches the brushes and holders $t^{12}$ and passes out over wire $z^4$, and over the proper contacts of a hand action reversing switch $z^5$, and then over wire $z^6$ to the brush holder $t^{13}$, and through the brushes thereof to the ring $t^{10}$. From the ring $t^{10}$, the said battery current passes over a rod or cable $t^{15}$ located in the hollow shaft $p^1$ of the pole changer and extending out from the right end thereof to a junction with one of the brush holders $t^7$, as shown in Fig. 8½, and, thence it passes over the brush $t^8$ carried by said holder $t^7$ to the proper opposite members of the commutator segments $t^5$ coupled together by the internal wires $t^{2\frac{1}{2}}$, shown in Fig. 15, and thence over wires $t^3$, hitherto noted, to the coils $t^2$ of the off-centering field, and back through the proper members of said wires $t^3$ to the proper members of said coupled opposite commutator segments $t^5$, and out through the other member of said brushes $t^8$ and holders $t^7$ to a cable $t^{15}$ extending through the hollow pole changer shaft $p^1$ to the collecting ring $t^{11}$, as shown in Fig. 8; and from the ring $t^{11}$ the current passes out through the brushes and holders $t^{14}$ to a return wire $z^7$ leading through the proper contacts of the reversing switch $z^5$ to a wire $z^8$ which leads back to the battery $z$. For convenience in tracing the current supplied from said two different sources to certain of the electrical devices on the car and to indicate those portions of some of the conductors which serve as a common path for the current from both of said sources, the following plan has been followed in the diagram views: The conductors containing single arrows carry dynamo current only. The conductors containing double arrows carry the battery current only; and the conductors containing the triple arrows may carry current from both sources, and will so carry current if the reversing switch $z^5$ in the battery circuit is in position to close that circuit, and the switch $s$ which controls the dynamo circuit on the car is in its closed position. If the latter is in its open position and the reversing switch $z^5$ is in its closed position, then the conductors marked with the triple arrows would carry only battery current.

The reason why the current from the dynamo or main supply circuit and the current from the battery $z$ on the car are both applied to the coils $p^2$ of the pole changer armature, as described, is to render said pole changer active from the battery current, which is supplied to the off-centering field, as hitherto described, at times when the current from the main supply circuit is cut out; and this can be done, whether the field or track magnets are in or out of the supply circuit at the time. The field or track magnets must, of course, be closed into the supply circuit in order to start the car; and any one of these track magnets has far greater strength than the off-centering field for the pole changers, but said off-centering field has sufficient strength to throw the magnetic driver of the pole changer off of the dead center, as might have occurred, if the car should have stopped with like poles of the pole changer in line with like poles of the field magnet. Hence, the battery circuit, containing said hand action reversing switch $z^5$, enables the operator to throw the pole changer off the dead center, if that should be necessary; and it is therefore always possible to start the car with the current. The pole changer will not thereby be thrown out of synchronism, in respect to the underlying field magnets, from the fact that the said field magnets have so much greater strength than the off-centering field that they will immediately bring the pole changer into proper relation with themselves, and thereafter maintain the same as long as the car continues to travel.

In practice, it will rarely ever happen that the car will stop in such a position that the rotary armature or magnetic driver of the pole changer will stop with one of its pole pieces on a dead center; but the off-centering field with the battery circuit supply connections thereto and to the coils of the pole changer enable this possible but rarely occurring condition to be met.

For some purposes, it is desirable to have the track or field magnets closed into the supply circuit, but the car armature to be cut out from the said supply circuit. For example, assume that the car is on a down grade, or is running under the effect of its own momentum, after having traveled for a time at high speed. It is then desirable to hold the car down onto the track. This I accomplished by the provision of means which enables the car armature to be cut out of the supply circuit while the field magnets remain closed into the supply circuit. Otherwise stated, I provide a short circuiting path for the dynamo or main supply circuit, which comes onto the car, so as to return the same without permitting this current to pass through the car armature, or the commutator for the same. This short circuit is controlled by one of the movable blades $k^1$ of the multi-plex switch. The details for this purpose are as follows: On the multi-plex switch, in the space which separates the upper from the lower sides of the switch-board, are a pair of fixed contacts $w$, as shown on Fig. 16. The said fixed contacts $w$, and the member of the movable blades $k^1$ of the multi-plex switch which co-operates therewith, serve as a bridge to connect inleading and outleading branches of the dynamo or main supply circuit, at a point between the rotary armature or magnetic driver of the pole changer and the commutator for the car armature. As shown, this is done by a pair of conductors $w^1$ and $w^2$, as illustrated in said Fig. 16. The conductor $w^1$ taps the wire $z^4$ which leads out from the collecting ring $t^9$, as hitherto described, and extends to one member of said pair of contacts $w$ at the multi-plex switch; and the wire $w^2$ leads from the other member of said contacts $w$ back to a junction with the wire $s^2$ which extends from the brush holder $r^{13}$ to the trucks of the car and over the same to the outer member of the third rail, as hitherto described. Otherwise stated, this short circuiting bridge has simply had the effect of connecting the brush holders $t^{12}$ and $r^{13}$ of the pole changer shown in Fig. 8. The course of the current on this short circuiting path, can be traced on Fig. 15, by first recalling the fact that both the dynamo current and the battery current pass through windings $p^2$ on the poles $p$ of the magnetic driver and come out over the radial contact $r^{19}$ to a junction with the rod $r^{20}$ and over its right hand portion and the connections therefrom to the large commutator, while the battery current follows the left hand portion of said rod $r^{20}$ and passes over the parts $r^{21}$ and $r^{22}$ to the collecting ring $t^9$. Now, when the short circuiting bridge is established, the dynamo current can not pass out over the right hand portion of the rod $r^{20}$, but must continue with the battery current over the left hand portion thereof and over the parts $r^{21}$ and $r^{22}$ to the collecting ring $t^9$ and out through brushes and brush holders $t^{12}$ to the conductor or wire $z^4$ leading therefrom; and, hence, it will then pass from the wire $z^4$ over the wire $w^1$ to the lower member of said bridging contacts $w$ at the multiple-switch, and, thence over the movable blades $k^1$ to the upper member of said contacts $w$, and back over the wire $w^2$ to the main return conductor $s^2$ which leads from the brush holder $r^{13}$ to the car trucks, as described.

From the foregoing, it will be seen that the short circuiting path for the dynamo current which comes onto the car is under the control of the movable contacts of the multi-plex switch and is closed whenever the said movable contacts are in their otherwise idle position, midway between the opposite sides of the switch-board. The multi-plex switch is, therefore, a complete controller for the car. By shifting its movable contacts, the operator starts the car with the current, varies its speed, brings the same to a stop, reverses its direction of travel, or cuts out the supply current from its armature and permits the car to run under the effect of momentum or gravity, as he may desire, while keeping the track or field magnets closed into the supply circuit to hold the car down onto the track, as hereinbefore noted. The operator, therefore, has complete control of the car without requiring the use of any brake whatever.

All the parts of the mechanism illustrated have now been specified and their functions described as far as deemed necessary for the purposes of this case, with the exception of a single detail. This will now be noted. By reference to Figs. 1, 3 and 5, it will be seen that there is attached to the housing $q$ of the pole changer at one end of the car trucks and to a projection $y^1$ from the end of the car armature core at the opposite end of the other truck, pivoted track magnet clearing devices $y$. These devices $y$ are pivoted to their supports and each is subject to a strong spring $y^2$ wound about the shaft portions of the said devices and reacting against their fixed supports at one end and to the lever arm portion of the clearing device at the other, as best shown in Fig. 5. The spring $y^2$ is of such strength that it will hold the clearing device $y$ in its clearing position against any ordinary resistance which it is intended to overcome, such as mud, snow, or ice projecting above the faces of the track magnets, but that the said spring will yield, if the clearing device should strike some fixed obstruction, like a fixed projecting stone or piece of timber, and, thereby, avoid the breakage which would otherwise occur.

*Summary of operation.*—In view of the introductory statements and the full specification as to the action of the different parts given in connection with the detailed description thereof hitherto made, it is not thought that any extended statement of the general operation is required. The following summary is deemed amply sufficient: Let it be assumed that the supply current is closed but that the car is standing stationary and that the movable blades of the multiplex switch are in their central position, or that position shown in dotted lines in Fig. 16, this being the position in which the current from the supply circuit is short circuited and cut out from the armature on the car, while leaving the field magnets under the car closed into the supply circuit. Otherwise stated, when the car is standing stationary, the track magnets of the field under the car are energized as hitherto explained. To start the car, the operator shifts the movable blades of the multiplex switch so as to bring the same into the position shown in Figs. 16 and 19, thereby connecting up the windings of the armature in multiple as shown in the small diagram, Fig. 19ᵃ. This establishes the first speed or starting step. Then if more power is required, either to start the car or to increase the speed, the operator shifts the movable blades of the multiplex switch so as to bring the same into the positions shown in the diagram, Fig. 20, thereby coupling up the armature windings and multiple series as indicated in the small diagram, Fig. 20ᵃ. If further power or speed is desired, the operator shifts the movable blades of the multiplex switch into the position shown in Fig. 21, thereby coupling up two of the four armature winding wires in multiple and in series with the other two wires, as indicated in the small diagram Fig. 21ᵃ. If still further power or speed is desired, the operator shifts the movable blades of the multiplex switch into the position shown in Fig. 22, thereby coupling up all the armature windings in series, as indicated in the small diagram Fig. 22ᵃ. The car will now be going at its maximum speed. When the operator desires to stop the car, he will simply shift the movable blades of the multiplex switch in the opposite direction and over to the first step on the opposite side of the switchboard, which will give the same form of armature winding coupling as that illustrated in Fig. 19 but with the current reversed, thus reversing the poles on the car armature magnets and tending to move the car in the opposite direction; and, if desired, the blades of said multiplex switch can be moved on to the second, the third, and to the fourth step on the other, or opposite side of the switchboard, according to how quickly it is desired to stop the car. Then as soon as the car does stop, the operator shifts the movable blades of the multiplex switch back to their central, or idle normal position and everything will be as stated in respect to the initial or starting position for tracing the operation.

Some of the advantages of the electric system, herein disclosed, for the propulsion of cars or other traveling bodies, are as follows: Compared with the overhead or underneath trolley systems now in general use, the system herein disclosed has a much higher limit of speed with a much larger factor of safety; the car is under much more perfect control; the electric energy is used to greater advantage, and, hence, with larger economy; the noise is reduced to a minimum, because of the absence of any gearing on the car, and the cost of maintenance is much less. These advantages much more than offset the increased first cost required to instal the system.

It will be understood that the essential principles of the system are capable of being embodied in manifold forms; and, hence, that the details may be varied widely without departing from the spirit of my invention. It must further be noted that the word car is used throughout this specification and the following claims in its broadest possible sense, so as to indicate all forms of traveling bodies to which the system of electric propulsion could apply.

What I claim is:—

1. The combination with a car, of a car track divided into insulated blocks, a sectional third rail or conductor, a D. C. series wound dynamo, a supply circuit from said dynamo extending along the line of the car's travel and divided into sections corresponding to said car track blocks, track magnets spaced apart from each other and connected with the feeding side of said supply circuit and with said sectional third rail to afford a magnetic field extending along the line of travel, a non-rotating armature on the car and devices subject to the control of the car for connecting into the supply circuit the field section of a given block occupied by the car and the armature on the car in series with said dynamo and which dynamo delivers current at a substantially constant current, varying in voltage according to load, substantially as described.

2. The combination with a car having a non-rotating armature thereon, of a track divided into insulated blocks, a sectional third rail or conductor, a D. C. series wound dynamo, a supply circuit from said dynamo extending along the line of travel and divided into sections corresponding to said track blocks, track magnets spaced apart from each other in the roadway and connected with the feeding side of said supply circuit and with said sectional third rail to afford a magnetic field extending along the line of travel, and automatic rheostats, in the supply circuit, containing devices which electrically connect the sections of said supply circuit into a closed metallic circuit from said dynamo, with minimum resistance at said rheostats, but which devices, under the control of the car operate, whenever a car comes onto a given block, to increase the resistance of the rheostat for that block, substantially as described.

3. The combination with a car, of a track divided into blocks insulated from each other and each provided with a rheostat housing, a third rail or conductor composed of sections insulated from each other and from the ground, magnets in the roadway constituting a magnetic field extending along the entire line of travel, a non-rotating armature, a rotary armature, having windings, actuated by said magnets, a pole changer on the car actuated by said rotary armature to change the polarity of the non-rotating armature, a D. C. series wound dynamo delivering a predetermined constant current varying in voltage according to load, a closed metallic circuit from said dynamo containing automatic rheostats, in said housings, having movable contacts, solenoids for controlling the movable contacts of said rheostat, a shunting connection from one of the track rails through the solenoid magnets, to the feed wire of the supply circuit, which field magnets are connected to the feeding side of the supply circuit and to the third rail, leaving the field circuit open at the sectional third rail, and which car is adapted, when it comes into a given block, to connect up the field magnets under the car, windings of the pole changer on the car, and the car armature and the solenoid magnet of the rheostat of that block, into the supply circuit, in series with each other, for coöperation, substantially as described.

4. The combination with a car having a non-rotating armature and a magnetic pole changer operated by the field electrically connected to said armature to change the polarity of the armature, of track magnets spaced apart from each other in the roadway and affording a magnetic field extending along the line of travel, and supply circuit connections for said parts including windings for said armature which windings are electrically variable at the will of the operator, substantially as described.

5. In an electric railway system, the combination with a magnetic field extending along the line of travel, of a car having a non-rotating armature and a magnetic pole changer operated by the field electrically connected to said armature to change the polarity of the armature, and which armature has windings that are electrically variable at the will of the operator, substantially as described.

6. In an electric railway system, the combination with a magnetic field extending along the line of travel, of a car having a non-rotating armature having windings and a magnetic pole changer actuated by said field and including a commutator for said armature, the windings of which armature and the conductors from the commutator to said armature are each made up of a plurality of wires, and a multi-plex switch adapted to couple the said wires in multiple, multiple series, or series, at the will of the operator, substantially as described.

7. In an electric railway system, the combination with a magnetic field extending along the line of travel, of a car having a non-rotating armature having windings and a magnetic pole changer actuated by said field and including a commutator for said armature, the windings of which armature and the conductors from the commutator to said armature are each made up of a plural ity of wires, and a multi-plex switch adapted to couple the said wires in multiple, multiple series, or series, at the will of the operator, a D. C. series wound dynamo and a supply circuit therefrom into which all the said devices are adapted to be connected in series under the control of the car, and which dynamo delivers current at a substantially constant predetermined current variable in voltage according to load, substantially as and for the purposes set forth.

8. In an electric railway system, the combination with a magnetic field extending along the line of travel, of a car having a non-rotating armature having windings and a magnetic pole changer actuated by said field and including a commutator for said armature, the windings of which armature and the conductors from the commutator thereto are made up of a plurality of wires, and a reversing muti-plex switch adapted to connect up said wires in multiple, multiple series, or in series, and reverse the order of these connections, at the will of the operator, substantially as described.

9. The combination with a non-rotating armature having a large number of windings arranged in sets to procure a plurality of poles of opposite polarity, of a magnetic pole changer comprising a magnetic driver, a stationary commutator, a set of traveling brushes carried by said driver and coöperating with said commutator segments, connections between said segments and the armature windings, a pair of collecting rings and traveling brushes carried by said driver for coöperating with said collecting rings, said commutator segments being sufficient to commutate the current through all the sets of said armature windings, substantially as described.

10. The combination with a magnetic field extending along the line of travel, of a car having a non-rotating armature and a magnetic pole changer operated by the field magnets to change the polarity of a non-rotating armature, of an off-centering field for said rotary pole changer, said off-centering field having a source of electrical energy independent of said magnetic field and located for action on said pole changer, with a force less than the operative force of a field magnet on said pole changer, but with a force sufficient to throw said pole changer off from a dead center in respect to the field magnet, substantially as described.

11. The combination with a magnetic field extending along the line of travel, of a car having a non-rotating armature and a magnetic rotary pole changer operated by the field magnets to change the polarity of the non-rotating armature, of an off-centering field for said rotary pole changer and supply connections for the same, including a commutator and a reversing switch, substantially as described.

12. The combination with a magnetic field extending along the line of travel, of a car having a non-rotating armature and a magnetic rotary pole changer operated by the field magnets to change the polarity of the non-rotating armature, of an off-centering field for said rotary pole changer, and a supply circuit for said off-centering field receiving current from a source which is independent of the source supplying current to said track field and car armature.

13. The combination with track magnets affording a magnetic field extending along the line of travel, of a car having a non-rotating armature and a rotary pole changer subject to the field magnets to change the polarity of the non-rotating armature, of an off-centering field for said rotary pole changer, a common supply circuit for said track magnets, car armature and the magnetic driver of the pole changer, and an independent supply circuit adapted to supply current both to the off-centering field and to the windings of said rotary pole changer.

14. The combination with a magnetic field extending along the line of travel, of a car having a non-rotating armature, and a magnetic rotary pole changer operated by the field magnets and provided with a commutator for said armature, of an off-centering field for said rotary pole changer, a storage battery on the car with connections therefrom to said off-centering field, a commutator for said off-centering field located in said storage battery circuit and operated by said magnetic rotary pole changer, and a hand action reversing switch in said storage battery circuit, substantially as described.

15. The combination with the car, the car track divided off into blocks, the insulated sectional third rail, the track magnets affording a magnetic field extending along the entire line of travel, the non-rotating armature and the rotary magnetic pole changer on the car, the series wound D. C. dynamo and the supply circuit therefrom, including a rheostat for each track block, which dynamo delivers a predetermined constant current but is automatically regulated to vary the voltage according to load, the car with brushes traveling in contact with said insulated third rail and associated with and arranged to connect the said field magnets, pole changer and car armature into the common supply circuit, in series, the storage battery on the car, the off-centering field for the magnetic driver, and the circuit connections from said storage battery to said off-centering field, and the windings of said pole changer provided with a commutator operated by said pole changer and containing a reversing switch, all for coöperation, substantially as described.

16. The combination with the track magnets affording a magnetic field extending along the line of travel, of the car having the non-rotating armature and a magnetic pole changer for the same, a common supply circuit for said track magnets and said car armature and windings of the pole changer, and short circuiting devices on the car adapted to be set by the operator to return the supply current without permitting the same to pass through the car armature or its commutator, substantially as described.

17. The combination with the track magnets affording a magnetic field along the line of travel, of the car having the non-rotating armature and the pole changer including a commutator for said armature, and provided with a multi-plex switch in the connections between the windings of the car armature core and the commutator for said armature, a common supply circuit for said track magnets and said electric devices on the car, and a short circuiting path for the supply current operative to return said supply current without permitting the same to pass through the said commutator or car armature, and which short circuiting path is controlled by one of the movable contacts of said switch, substantially as described.

In testimony whereof I affix my signature in presence of two witnesses.

PAUL W. LEFFLER.

Witnesses:
HARRY D. KILGORE,
JAS. F. WILLIAMSON.